US012716161B2

(12) United States Patent
Alban et al.

(10) Patent No.: US 12,716,161 B2
(45) Date of Patent: Aug. 25, 2026

(54) CLEANING FLUID COMPOSITION AND METHOD FOR AUTONOMOUSLY CLEANING A GARMENT IN A KIOSK

(71) Applicant: LaundrySucks.io Inc., Sandy Springs, GA (US)

(72) Inventors: Felicity Alban, Roswell, GA (US); Thibault Corens, Roswell, GA (US); Nishant Jain, Roswell, GA (US); Lafe Zabowski, Marietta, GA (US)

(73) Assignee: LaundrySucks.io Inc., Sandy Springs, GA (US)

( * ) Notice: Subject to any disclaimer, the term of this patent is extended or adjusted under 35 U.S.C. 154(b) by 40 days.

(21) Appl. No.: 18/798,695

(22) Filed: Aug. 8, 2024

(65) Prior Publication Data

US 2025/0051996 A1 Feb. 13, 2025

Related U.S. Application Data

(60) Provisional application No. 63/531,522, filed on Aug. 8, 2023.

(51) Int. Cl.
*D06F 43/00* (2006.01)
*D06F 73/02* (2006.01)
(Continued)

(52) U.S. Cl.
CPC .......... *D06F 43/007* (2013.01); *D06F 43/005* (2013.01); *D06F 73/02* (2013.01);
(Continued)

(58) Field of Classification Search
CPC ...... D06F 43/007; D06F 43/005; D06F 73/02; D06F 58/10; D06F 58/203; D06F 2103/02; D06F 2103/06; D06F 2103/08; D06F 2103/34; D06F 2103/62; D06F 2105/20; D06F 2105/22; D06F 2105/38; D06F 2105/40; G06Q 20/18
See application file for complete search history.

(56) References Cited

U.S. PATENT DOCUMENTS 5,305,484 A * 4/1994 Fitzpatrick .............. D06F 73/02 68/6
5,815,961 A * 10/1998 Estes ....................... D06F 73/02 38/14

(Continued)

*Primary Examiner* — Joseph L. Perrin
(74) *Attorney, Agent, or Firm* — Run8 Patent Group, LLC; Peter Miller; Marissa Kohrman

(57) ABSTRACT

One variation of a method includes: receiving a garment within a chamber of a kiosk; accessing a garment type and a fabric type of the garment; allocating a volume of a cleaning fluid for application on a target region of the garment, predicted to contain odorous molecules based on the garment type, based on the fabric type; dispensing the volume of the cleaning fluid onto the target region of the garment via a nozzle to modify odorous molecules in the target region of the garment and perfume the garment; articulating a steam nozzle to expel a steam jet across an interior surface of the garment, tension local regions of the garment, and locally heat regions of the garment above a transition temperature; and cooling the garment below the transition temperature to set the garment in an unwrinkled state.

11 Claims, 7 Drawing Sheets

(51) Int. Cl.

| | |
|---|---|
| *D06F 58/10* | (2006.01) |
| *D06F 58/20* | (2006.01) |
| *D06F 103/02* | (2020.01) |
| *D06F 103/06* | (2020.01) |
| *D06F 103/08* | (2020.01) |
| *D06F 103/34* | (2020.01) |
| *D06F 103/62* | (2020.01) |
| *D06F 105/20* | (2020.01) |
| *D06F 105/22* | (2020.01) |
| *D06F 105/38* | (2020.01) |
| *D06F 105/40* | (2020.01) |
| *G06Q 20/18* | (2012.01) |

(52) U.S. Cl.

CPC ............ *D06F 58/10* (2013.01); *D06F 58/203* (2013.01); *D06F 2103/02* (2020.02); *D06F 2103/06* (2020.02); *D06F 2103/08* (2020.02); *D06F 2103/34* (2020.02); *D06F 2103/62* (2020.02); *D06F 2105/20* (2020.02); *D06F 2105/22* (2020.02); *D06F 2105/38* (2020.02); *D06F 2105/40* (2020.02); *G06Q 20/18* (2013.01)

(56) References Cited

U.S. PATENT DOCUMENTS

| | | | | |
|---|---|---|---|---|
| 8,464,562 | B1 * | 6/2013 | Colburn | D06F 73/02 68/222 |
| 2010/0242302 | A1 * | 9/2010 | Meschkat | D06F 58/203 34/357 |
| 2010/0299952 | A1 * | 12/2010 | Hollinger | D06F 58/10 34/201 |
| 2010/0299954 | A1 * | 12/2010 | Roselle | F26B 25/06 34/390 |
| 2020/0096954 | A1 * | 3/2020 | Kim | D06F 34/18 |
| 2020/0370236 | A1 * | 11/2020 | Chae | D06F 73/00 |
| 2021/0032797 | A1 * | 2/2021 | Shin | D06F 67/005 |
| 2021/0062404 | A1 * | 3/2021 | Ham | D06F 71/20 |

* cited by examiner

CLEANING FLUID COMPOSITION AND METHOD FOR AUTONOMOUSLY CLEANING A GARMENT IN A KIOSK

CROSS-REFERENCE TO RELATED APPLICATIONS

This application claims the benefit of U.S. Provisional Application No. 63/531,522, filed on 8 Aug. 2023, which is incorporated in its entirety by this reference.

This Application is related to U.S. patent application Ser. No. 18/582,637, filed on 20 Feb. 2024, Ser. No. 17/632,709, filed on 3 Feb. 2022, and Ser. No. 17/258,531, filed on 7 Jan. 2021, each of which are incorporated in their entireties by this reference.

TECHNICAL FIELD

This invention relates generally to the field of dry cleaning and more specifically to a new and useful method for autonomously cleaning a garment in a kiosk in the field of dry cleaning.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
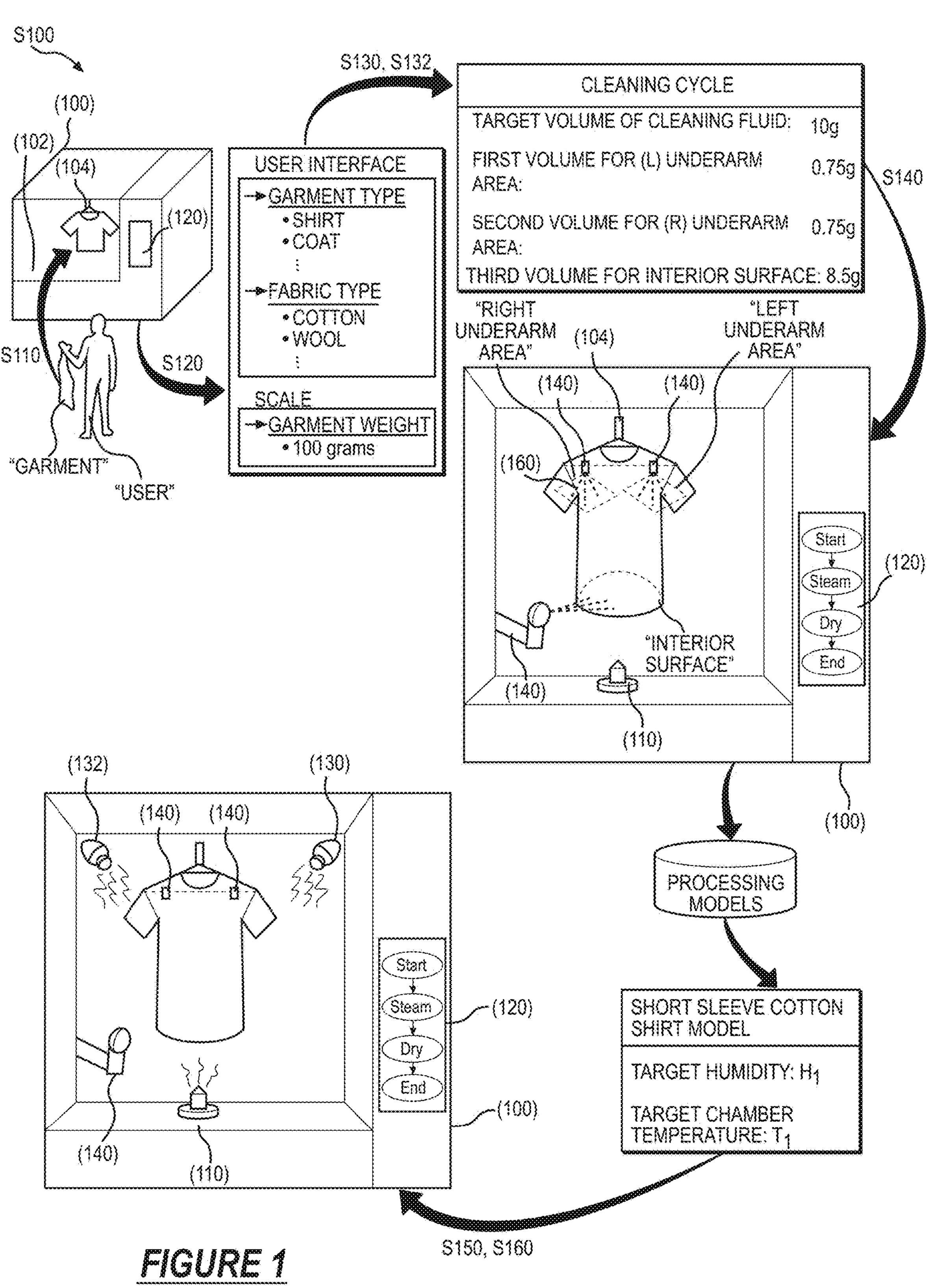
FIG. 1 is a flowchart representation of a method.

As shown in FIG. 1, a method S100 for applying a cleaning fluid includes: receiving a garment arranged on a hanger within a chamber of a kiosk in Block S110; accessing a set of garment characteristics of the garment, the set of garment characteristics including a garment type and a fabric type; and allocating a first volume of a cleaning fluid for application on a first target region of the garment, predicted to contain odorous molecules based on the garment type, based on the fabric type in Block S130.

The method S100 further includes, during a cleaning cycle, dispensing the first volume of the cleaning fluid onto the first target region of the garment via a first nozzle to modify odorous molecules in the first target region of the garment and perfume the garment in Block S140; articulating a steam nozzle, facing an interior surface of the garment to expel a steam jet across the interior surface of the garment, tension local regions of the garment, and locally heat regions of the garment above a transition temperature in Block S150; and cooling the garment below the target garment temperature to set the garment in an unwrinkled state in Block S160.

1.1 Variation: Setting Steam-Cleaning Temperature and Humidity

One variation of the method S100 includes: receiving a garment arranged on a hanger within a chamber of a kiosk in Block S110; accessing a set of garment characteristics of the garment, the set of garment characteristics including a garment type and a fabric type; allocating a first volume of a cleaning fluid for application on a first target region of the garment, predicted to contain odorous molecules based on the garment type, based on the fabric type in Block S130; and allocating a second volume of the cleaning fluid for application on a second target region of the garment, predicted to contain odorous molecules based on the garment type, based on the fabric type in Block S132.

This variation of the method S100 further includes, during a cleaning cycle: dispensing the first volume of the cleaning fluid onto the first target region of the garment via a first nozzle to modify odorous molecules in the first target region of the garment and perfume the garment in Block S140; dispensing the second volume of the cleaning fluid onto the second target region of the garment via a second nozzle to modify odorous molecules in the second target region of the garment and perfume the garment in Block S142; articulating a steam nozzle, facing an interior surface of the garment to expel a steam jet across the interior surface of the garment, tension local regions of the garment, and locally heat regions of the garment above a transition temperature in Block S150; and cooling the garment below the target garment temperature to set the garment in an unwrinkled state in Block S160.

2. Cleaning Fluid Composition

Figure 7:
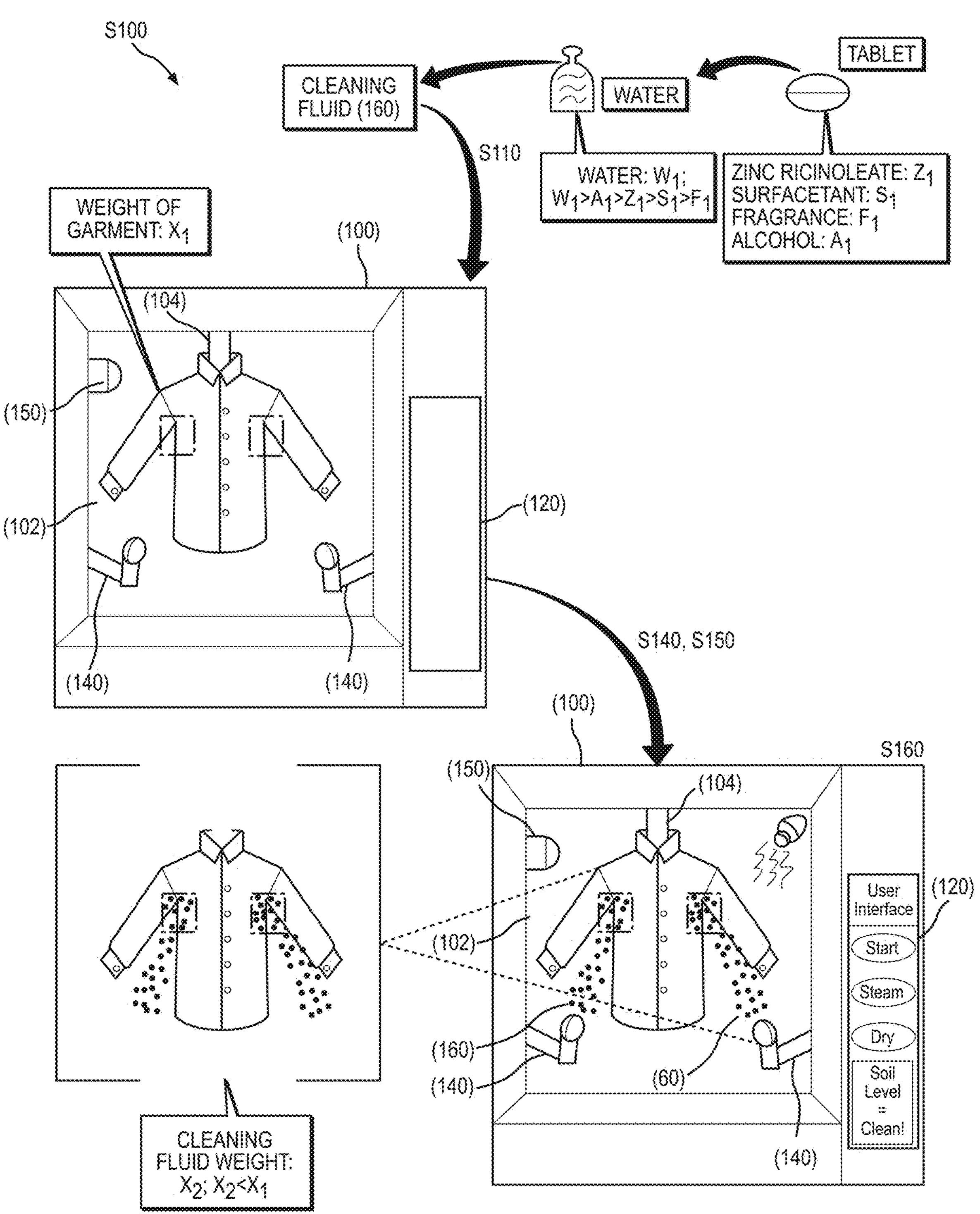
FIG. 7 is a flowchart representation of one variation of the method.

As shown in FIG. 7, a cleaning fluid composition 160 includes: a first proportion of Zinc ricinoleate configured to modify odorous molecules in a garment arranged in a chamber; a second proportion of a surfactant configured to increase wetting of the first proportion of Zinc ricinoleate into fabric of the garment; a third proportion of a fragrance configured to inject a scent into fabric of the garment; and a fourth proportion of an alcohol configured to increase dispersion of the third proportion of the fragrance into fabric of the garment.

In one variation, the cleaning fluid composition 160 further includes a fifth proportion of water configured to dissolve the first proportion of Zinc ricinoleate, the second proportion of the surfactant, and the fourth proportion of the alcohol.

In another variation, the cleaning fluid composition 160 further includes a sixth proportion of an anti-bacterial ingredient configured to: disinfect the garment by killing bacteria; neutralize odor of the garment caused by bacterial growth on the garment; and prevent growth of odors by killing odor-causing bacteria on the garment.

In yet another variation, the cleaning fluid composition 160 further includes a seventh proportion of a pro-bacterial ingredient configured to: increase growth of beneficial bacteria on the garment, the beneficial bacteria configured to consume and metabolize soils on the garment; and restrict growth of odor-causing bacteria on the garment.

In yet another variation the cleaning fluid composition 160 further includes the seventh proportion of the pro-bacterial ingredient in place of (i.e., without, excluding) the sixth proportion of the anti-microbial ingredient.

3. Applications

Generally, a cleaning fluid 160 is configured to: deodorize a garment by neutralizing and modifying a molecular structure of odorous molecules on the garment; and facilitate removal of odorous molecules from the garment by application of steam. In particular, this cleaning fluid 160 includes: a first proportion of Zinc ricinoleate (or Zinc ricinoleate-based compound) configured to modify (e.g., bind, change) and neutralize odorous molecules on the garment; a second proportion of a surfactant configured to increase the wetting of the cleaning fluid 160 and ensure that the surface tension of the cleaning fluid 160 does not interfere with penetration of the first proportion of Zinc ricinoleate into a polymerous matrix of fabric of the garment; a third proportion of fragrance configured to impart a scent to the garment; and a fourth proportion of alcohol (e.g., ethanol) configured to dissolve the fragrance in the cleaning fluid 160.

A kiosk 100—such as described in U.S. patent application Ser. No. 17/632,709—can execute Blocks of the method S100: to identify or access characteristics of a garment (e.g., a garment type, a fabric type, a garment size, a weight, a geometry, a soil level) loaded into the kiosk 100; to retrieve and define volumes of the cleaning fluid 160 to preferentially apply to select regions on the garment; to autonomously apply these volumes of the cleaning fluid 160 to these regions on the garment; and to steam, wrinkle release, and dry the garment. In particular, steam applied by the kiosk 100 to the garment may not (fully) neutralize or remove odorous molecules on the garment.

Therefore, the kiosk 100 can execute Blocks of the method S100 to: retrieve or calculate volumes of the cleaning fluid 160 predicted to fully deodorize likely-odorous regions of the garment, but not sufficient to over-wet or saturate the garment; to autonomously apply these volumes of the cleaning fluid 160 to these regions of the garment, thereby neutralizing odorous molecules on the garment and deodorizing the garment; and to steam and dry the garment, thereby removing wrinkles from the garment. Thus, the kiosk 100 can execute Blocks of the method S100 to deodorize and steam clean the garment such that a user perceives the garment as clean.

3.1 Target Cleaning Fluid Volume

Generally, after receiving the garment, the kiosk 100 can define target volumes of cleaning fluid 160 to apply to select regions of the garment based on characteristics of the garment, such as based on: the weight of the garment, which may correspond to fabric thickness; the fabric type of the garment (e.g., cotton, silk, or polyester), which may correspond to odor-holding capacity and liquid saturation limits of the garment; the type of the garment (e.g., a dress shirt, a sleeveless blouse, an evening dress, or a suit jacket), which may correspond to different combinations of likely odorous regions; the soil level of the garment (e.g., light, normal, heavy), which may correspond to a sweat level or a stain dimension of odorous regions of the garment; and/or size or geometry of the garment, which may correspond to the area of or distribution of odorous regions of the garment and total volume or weight of odorous molecules in these odorous regions.

For example, a heavier garment may contain a thicker or denser fabric that requires a greater volume of cleaning fluid 160 to achieve a full depth of cleaning fluid 160 penetration into the fabric and to achieve odor neutralization over the full thickness of the fabric. Thus, the kiosk 100 can define the target volume of the cleaning fluid 160 proportional to the weight of the garment, so that more cleaning fluid 160 is applied to heavier garments and less cleaning fluid 160 is applied to lighter garments. For example, the target volume of the cleaning fluid 160 can be 10% of the weight of the garment.

Additionally, or alternatively, the kiosk 100 can define the target volume of the cleaning fluid 160 to preferentially apply to select regions of the garment based on the fabric type of the garment. Different fabric types: may exhibit different odor retention characteristics; may promote body odor, such as polyester and nylon, which promote more body odor than cotton and other natural fabrics; and may exhibit different liquid absorption or penetration rates (or "wettability") (e.g., cotton may absorb water faster than polyester). Thus, the kiosk 100 can define a greater volume of cleaning fluid 160 to apply to a garment made of a fabric: that exhibits greater odor retention characteristics; that promotes body odor; and/or that exhibits water-resistant characteristics (e.g., polyester). Similarly, the kiosk 100 can define a lesser volume of cleaning fluid 160 to apply to a garment made of a fabric: that exhibits lesser odor retention characteristics; that does not promote body odor; and/or that readily absorbs water, such as cotton.

Therefore, the kiosk 100 can define the target volume of cleaning fluid 160 to preferentially apply to select regions of the garment based on the garment weight and/or the fabric type of the garment and apply the target volume of the cleaning fluid 160 to the garment: to facilitate removal of odors from the garment; and, simultaneously, avoid oversaturation of the garment with the cleaning fluid 160, which may result in the garment becoming oversaturated with fragrance, exhibiting an extended drying duration, changing texture, etc.

3.2 Target Garment Regions

Furthermore, the kiosk 100 can: define target regions onto which to apply (e.g., spray) volumes of the cleaning fluid 160, such as based on the garment type (e.g., target armpit regions if the garment includes arms; a bottom edge of the garment if the garment is a dress or pant); and/or subdivide the target volume of the cleaning fluid 160 into subvolumes to (preferentially) apply to these target regions of the garment, such as based on the type and size of the garment (e.g., larger target armpit regions for dress shirts, larger target back regions for suit jackets).

In particular, the kiosk 100 can define a first volume of the cleaning fluid 160 for application onto a first target region (e.g., an underarm region) of the garment during the cleaning cycle and define a second volume of the cleaning fluid 160 for application onto a second target region (e.g., an interior surface area) of the garment during the cleaning cycle. Different garment types may have regions that are more likely to become soiled during use and contain odorous molecules. For example, underarm regions of a shirt may include more odorous molecules than other regions of the shirt. Therefore, instead of distributing the cleaning fluid 160 evenly throughout the interior surface area of the shirt, the kiosk 100 may apply more cleaning fluid 160 per unit area to the underarm regions of the shirt than to the rest of the interior surface area of the shirt. However, other garment types, such as pants, may have relatively even distribution of odorous molecules throughout. Therefore, the kiosk 100 may apply the cleaning fluid 160 evenly throughout the surface area of pants.

Accordingly, based on the garment type, the kiosk 100 can define a first volume of the cleaning fluid 160 for application onto a first target region (e.g., an underarm region) of the garment and define a second, different volume of the cleaning fluid 160 for application onto a second target region (e.g., an interior surface area) of the garment to: apply more cleaning fluid 160 per unit area to the region of the garment that is most likely to have higher concentration of odorous molecules; increase the effectiveness of the cleaning fluid 160 in removing odors from the garment; reduce the volume of cleaning fluid 160 needed to deodorize the garment; and avoid saturating the garment with cleaning fluid 160, which may delay completion of the cleaning cycle for the garment.

4. Cleaning Fluid Composition

Generally, the cleaning fluid composition 160 can include: a first proportion of Zinc ricinoleate configured to modify odorous molecules in a garment arranged in a chamber 102; a second proportion of a surfactant configured to increase wetting of the first proportion of Zinc ricinoleate into fabric of the garment; a third proportion of a fragrance configured to inject a scent into fabric of the garment; and a fourth proportion of an alcohol configured to increase dispersion of the third proportion of the fragrance into fabric of the garment.

In one implementation, the first proportion of Zinc ricinoleate is greater than the second proportion of the surfactant; the fourth proportion of alcohol is greater than the first proportion of Zinc ricinoleate; and the second proportion of the surfactant is greater than the third proportion of the fragrance.

In one variation the cleaning fluid composition 160 further includes a fifth proportion of water configured to dissolve the first proportion of Zinc ricinoleate, the second proportion of the surfactant, and the fourth proportion of the alcohol. In this variation, the cleaning fluid composition 160 includes: between 1 percent and 10 percent by weight of Zinc ricinoleate; between 0.1 percent and 10 percent by weight of the surfactant; between 0.1 percent and 0.99 percent by weight of the fragrance; between 10 percent and 20 percent by weight of the alcohol; and between 65 percent and 84 percent by weight of water.

4.1 Deodorizing Ingredient

Generally, the cleaning fluid composition 160 can include the first proportion of Zinc ricinoleate (e.g., a water-soluble Zinc ricinoleate complex) configured to modify odorous molecules on the garment. In particular, Zinc ricinoleate can: chemically bond to odor-intensive organic substances such as sulfur- or nitrogen-containing functional groups (e.g., mercaptans, thioethers, low molecular weight carboxylic acids, amines); chemically modify or change the molecular structure of these odor-intensive organic substances; and therefore neutralize these odor-intensive organic substances via chemical binding.

The cleaning fluid composition 160 can include the first proportion of Zinc ricinoleate with a target concentration of 5 percent by weight in the cleaning fluid composition 160, such as 5 grams of Zinc ricinoleate in 100 grams of cleaning fluid composition 160. Additionally, the cleaning fluid composition 160 can include the first proportion of the Zinc ricinoleate within a target range between 1 percent and 10 percent by weight (referred to herein as wt %).

In one variation, the cleaning fluid composition 160 can include a first proportion of an alternative active ingredient such as Zinc ricinoleate-based compound, soyaethyl morpholinium ethosulfate, or soyaethyl morpholinium ethosulfate-based compound. However, the cleaning fluid composition 160 can include any other target concentration of any other odor absorber.

4.1 Surfactant

The cleaning fluid composition 160 further includes the second proportion of the surfactant configured to: increase miscibility of the first proportion of Zinc ricinoleate in water; and increase wetting of water and the first proportion of Zinc ricinoleate into the fabric by decreasing surface tension of water.

In particular, the surfactant can reduce surface tension of water in the cleaning fluid composition 160, thereby enabling the cleaning fluid composition 160 to penetrate into the polymerous matrix of fabric of the garment instead of accumulating on the surface of the garment. Thus, the surfactant can enable the cleaning fluid composition 160 to maintain uniform distribution over the surface of the garment, ensuring thorough coverage and allowing Zinc ricinoleate to reach the odorous molecules on the garment.

More specifically, the surfactant can promote the removal of stains on the garment by loosening them from the surface of the garment. In particular, the surfactant can break down the adhesive forces that bind the stain to the surface of the garment.

Furthermore, in one implementation, the surfactant can emulsify the first proportion of Zinc ricinoleate in the cleaning fluid composition 160, thereby ensuring even distribution (e.g., mixing) of the first proportion of Zinc ricinoleate in the cleaning fluid composition 160 and ensuring that the first proportion of Zinc ricinoleate is evenly applied to the garment.

In one implementation, the cleaning fluid composition 160 can include the second proportion of the surfactant, such as coco-glucoside, with a target concentration of 1 wt % in the cleaning fluid composition 160, such as 1 gram of surfactant in 100 grams of cleaning fluid composition 160. Additionally, the cleaning fluid composition 160 can include the second proportion of the surfactant within a target range between 0.1 and 10 wt %.

In one variation, the cleaning fluid composition 160 can include the second proportion of an alternative surfactant such as Decyl glucoside, Cocamidopropyl betaine, Alkyl glucosides, Dioctyl Sulfosuccinate, Polysorbates, Ethoxylated alcohols, Glycerin, Polyethylene glycol, or Soyethyl mopholinium Ethosulfate. However, the cleaning fluid composition 160 can include any other target concentration of any other surfactant.

4.3 Fragrance

The cleaning fluid composition 160 includes the third proportion of the fragrance, such as an essential oil (e.g., lavender essential oil, jasmine essential oil). The fragrance can inject a scent into fabric of the garment (e.g., perfume the garment), thereby enabling a user to perceive the garment as clean.

In one implementation, the cleaning fluid composition 160 can include the third proportion of the fragrance with a target concentration of less than 1 wt % in the cleaning fluid composition 160. Additionally, the cleaning fluid composition 160 can include the third proportion of the fragrance within a target range between 0.1 and 0.99 wt %.

4.4 Alcohol

The cleaning fluid composition 160 can include the fourth proportion of alcohol configured to increase dispersion of the third proportion of the fragrance into fabric of the garment. In particular, the fourth proportion of alcohol can act as a solvent for the fragrance in the cleaning fluid composition 160 and carry fragrance molecules out of the fabric of the garment during evaporation. Furthermore, the fourth proportion of alcohol can enable the cleaning fluid composition 160 to disinfect the garment (e.g., by killing bacteria on the garment).

In one implementation, the cleaning fluid composition 160 can include the fourth proportion of alcohol, such as ethanol, with a target concentration of 10 wt % in the cleaning fluid composition 160. Additionally, the cleaning fluid composition 160 can include the fourth proportion of alcohol within a target range between 10 and 20 wt % of the cleaning fluid composition 160.

4.5 Water

In one implementation, the cleaning fluid composition 160 can include a fifth proportion of water configured to: dissolve the first proportion of Zinc ricinoleate, the second proportion of the surfactant, and the fourth proportion of the alcohol; and cooperate with the first proportion of Zinc ricinoleate, the second proportion of the surfactant, the third proportion of the fragrance, and the fourth proportion of the alcohol to maintain uniform distribution of the cleaning fluid composition 160 over a surface of the garment.

In one implementation, the cleaning fluid composition 160 can include the fifth proportion of water with a target concentration of 84 wt %. Additionally, the cleaning fluid composition 160 can include the fifth proportion of water within a target range between 65 and 84 wt % of the cleaning fluid composition 160.

Furthermore, the fifth proportion of water can dilute the cleaning fluid composition 160, thereby reducing the concentration of the other components (e.g., Zinc ricinoleate, surfactant, fragrance, alcohol). Therefore, the fifth proportion of water can distribute the active first proportion of Zinc ricinoleate, the second proportion of the surfactant, the third proportion of the fragrance, and the fourth proportion of ethanol, and fragrance evenly throughout the solution, thereby enabling Zinc ricinoleate and the surfactant to spread uniformly over the surface of the garment during application and increasing the effectiveness of the cleaning fluid composition 160.

4.6 Variation: Anti-Bacterial Ingredients

In one implementation, the cleaning fluid composition 160 can include a sixth proportion of an anti-bacterial ingredient configured to: disinfect the garment by killing bacteria; neutralize odor of the garment that may be caused by bacterial growth on the garment; and prevent growth of further odors by killing odor-causing bacteria on the garment.

In one variation, the anti-bacterial ingredient can include: thyme oil; clove oil; tee tree oil; citric acid; rosemary oil; alpha hydroxy acids (e.g., hops); ionic silver; Benzalkonium chlorides; and/or ammonium compounds; etc.

4.7 Variation: Pro-Bacterial Ingredients

In one implementation, the cleaning fluid composition 160 can include a seventh proportion of a pro-bacterial ingredient (e.g., beneficial bacterial spores) configured to: increase growth of beneficial bacteria—configured to consume and metabolize soils (e.g., dirt and/or odor molecules)—on the garment; restrict growth of harmful odor-causing bacteria on the garment; and, thereby, clean the garment and prevent further odors.

In one variation, the pro-bacterial ingredient can include: a concentrated dry blend of microbes (e.g., probiotics); a powder blend of beneficial bacterial spores; and/or a concentrated liquid blend of microbes.

4.7 Alternative Forms

In one implementation, the cleaning fluid composition 160 can be formulated as a tablet of concentrated cleaning fluid composition 160 ingredients (e.g., zinc ricinoleate, surfactant, fragrance, alcohol) in solid and/or concentrated form. For example, the first proportion of Zinc ricinoleate, the second proportion of surfactant, the third proportion of fragrance, and the fourth proportion of alcohol cooperate to form a solid tablet dissolvable in water within the kiosk prior to automatic application of the cleaning fluid composition onto the garment by the kiosk, via the set of nozzles.

In another implementation, the cleaning fluid composition 160 can be formulated as a concentrated liquid that can be added to water to produce the cleaning fluid composition 160 in a liquid state.

Therefore, the cleaning fluid composition 160 (or cleaning solution) can be formed, transported, and stored in an alternative, lightweight, and/or compact form, such as to reduce cleaning solution storage volume in the kiosk 100 and thus increase volumetric efficiency of the kiosk 100.

5. Kiosk

Figure 4:
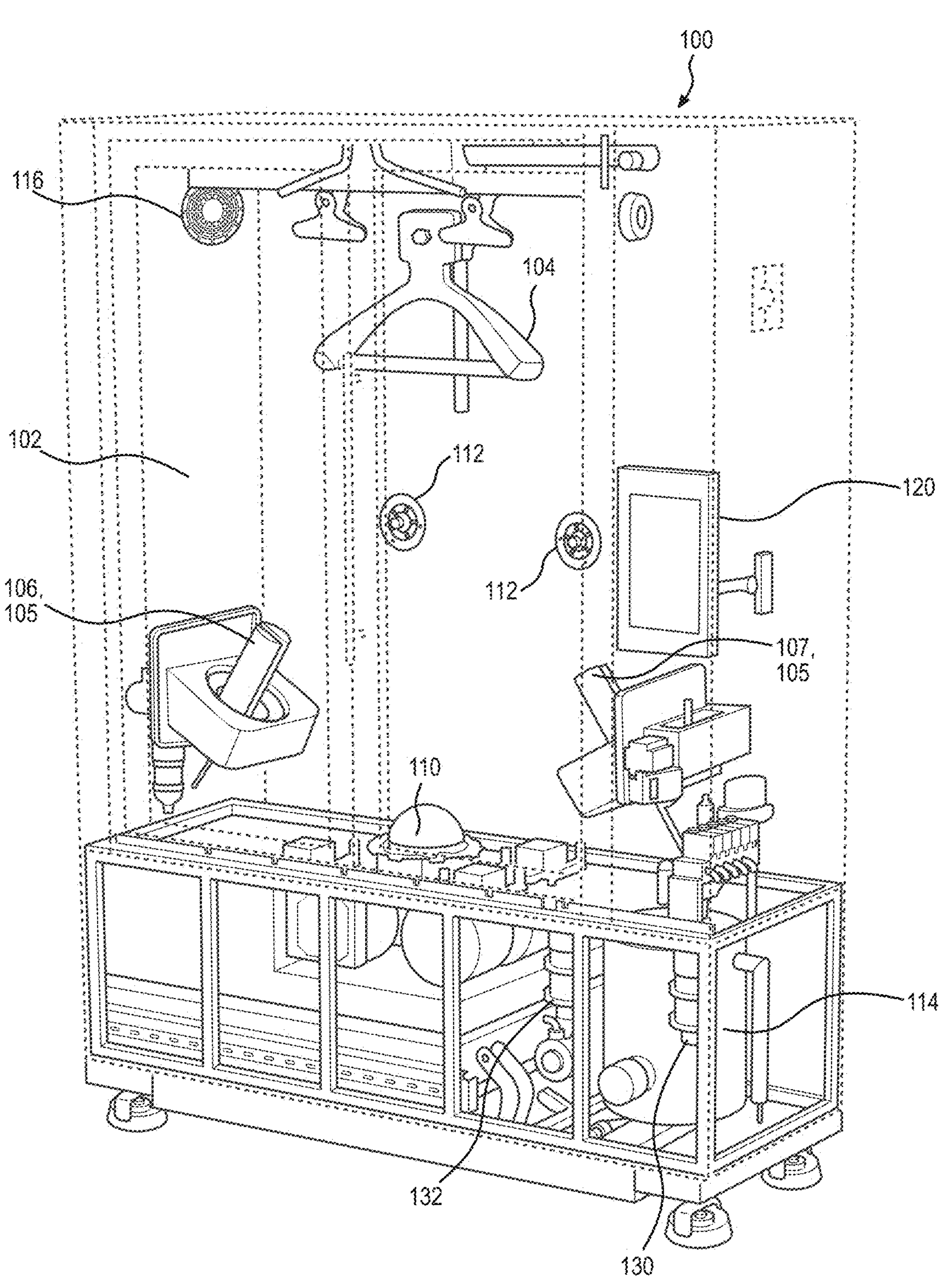
FIG. 4 is a schematic representation of one variation of the system.

As described in U.S. patent application Ser. Nos. 18/582,637, 17/258,531, and 17/632,709, which are incorporated herein by reference, and shown in FIG. 4, the kiosk 100 can include: a housing defining the chamber 102; a hanger 104 arranged in an overhead position within the chamber 102; a left sleeve retainer 107 configured to retain a left sleeve cuff of the garment; a right sleeve retainer 106 configured to retain a right sleeve cuff of the garment; a hot dryer 130 configured to inject heated air into the chamber 102; a cold dryer 132 configured to inject cool (e.g., ambient) air into the chamber 102; a set of dryer nozzles 112 configured to direct heated and cooled air from the hot dryer 130 and cold dryer 132, respectively, selectively toward and around the garment; an exhaust 116 (e.g., an outlet) configured to vent air (e.g., moist, heated air) out of the chamber 102; a steam generator 114 configured to heat water into steam; a steam nozzle 110 arranged in the base of the chamber 102 below the camera 150 and configured to expel pressurized steam supplied from the steam generator; and a steam valve configured to selectively release steam from the steam generator 114 to the steam nozzle 110.

In one implementation, the kiosk 100 includes: a chamber 102; a hanger 104 arranged within the chamber 102 and configured to receive a garment; a set of nozzles 140 arranged within the chamber 102 and below the hanger 104 and configured to dispense volumes of a cleaning fluid onto regions of the garment to modify odorous molecules in the garment and perfume the garment; and a steam nozzle 110 arranged below the hanger 104, interposed between the set of nozzles 140, and configured to expel a steam jet across an interior surface of the garment to tension local regions of the garment and increase a modification rate of the cleaning fluid to modify (e.g., a molecular structure of) odorous molecules in the garment.

5.1 Heating Element+Dryers+Multi-Axis Stage

The kiosk 100 further includes: an air inlet (or "vent") configured to supply air (e.g., ambient air) to the hot dryer 130 and the cold dryer 132; a fan configured to direct (or "propel") air through the air inlet; a valve configured to selectively direct air from the air inlet to the hot dryer 130 and/or the cold dryer; and a heating element configured to heat air entering, occupying, and/or exiting the hot dryer 130. In one implementation, the heating element includes an electrical (e.g., resistive) heating element configured to convert electrical energy into thermal energy and transfer the thermal energy to the air within the hot dryer 130.

In another implementation, the heating element includes a steam-to-air heat exchanger 104: fluidly coupled to the steam generator 114 via a valve; and configured to transfer heat from the steam—supplied by the steam generator 114—into air passing into, occupying, or exiting the hot dryer 130. Therefore, in this implementation, the steam-to-air heat exchanger 104 can heat air—entering or occupying the chamber 102 of the kiosk 100—with residual heat stored in water contained in the steam generator 114, thereby reducing a temperature of the steam generator 114 following completion of a steaming segment of a processing cycle and reducing energy consumption by the kiosk 100 during a drying segment of the processing cycle.

The kiosk 100 further includes a multi-axis stage configured to manipulate the steam nozzle 110, such as by sweeping the steam nozzle 110 in a three-dimensional spiral pattern to raster a steam jet from the steam nozzle 110 across interior surfaces of a garment loaded into the kiosk 100.

5.2 Nozzles

The kiosk 100 further includes a set of nozzles 140 (e.g., spray nozzles, aerosolizing nozzles) configured to expel volumes of the cleaning fluid 160 onto an interior or exterior surface of the garment.

Figure 2:
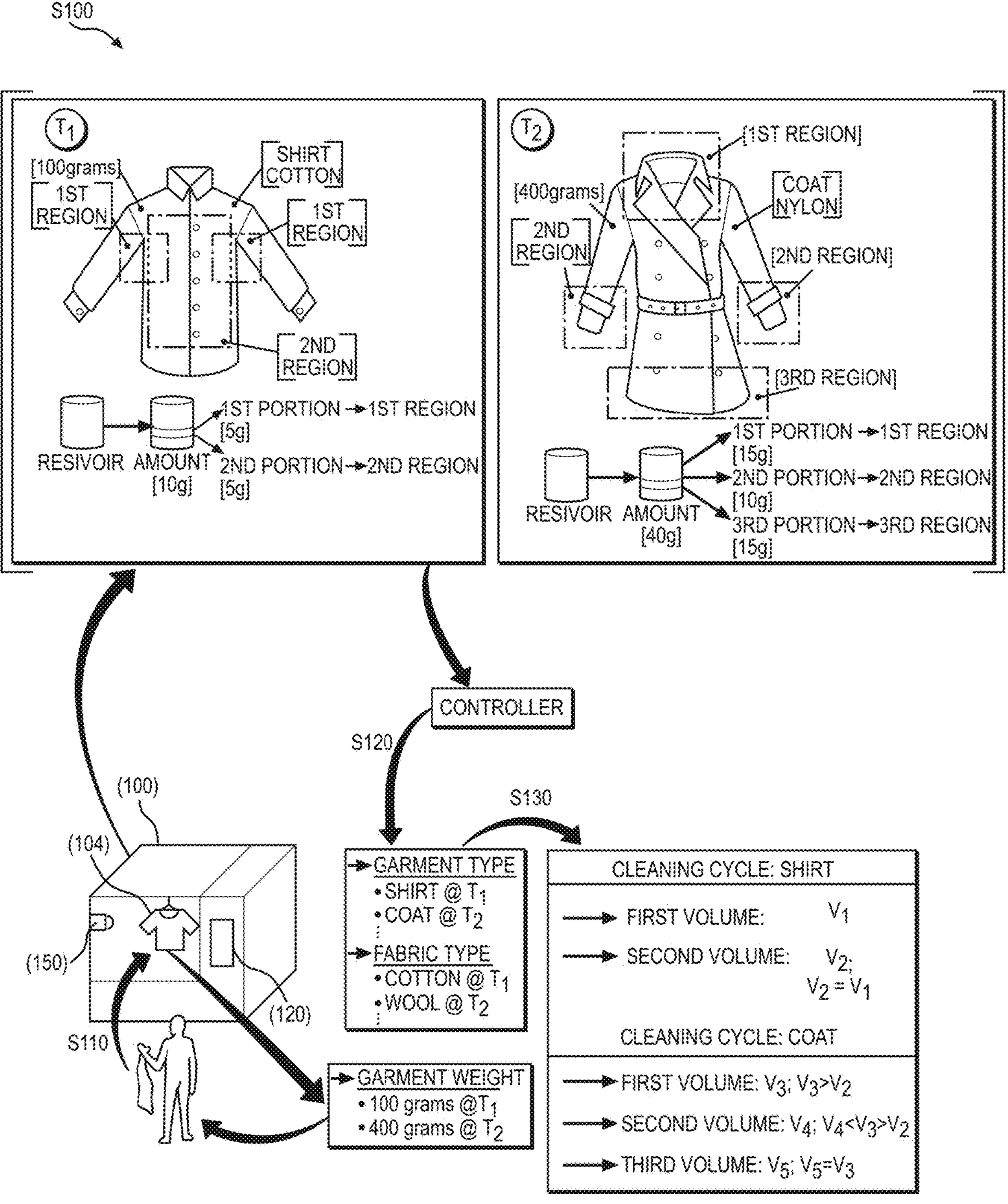
FIG. 2 is a flowchart representation of one variation of the method.

In one implementation, the kiosk 100 includes a set of fixed spray nozzles 140 arranged on the hanger 104. Each spray nozzle 140 is configured to expel a volume of the cleaning fluid 160 onto an interior surface of the garment. For example, the kiosk 100 can include: a set of (e.g., two) spray nozzles 140 arranged on the hanger 104 and facing the interior surface of a sleeved shirt. A left nozzle, in the set of nozzles 140, is arranged proximal a left side of the hanger 104 and configured to expel a volume of the cleaning fluid 160 onto an interior surface of a left underarm region of the sleeved shirt. A right nozzle, in the set of nozzles 140, is arranged proximal the right side of the hanger 104, opposite the left side, and configured to expel a volume of the cleaning fluid 160 onto an interior surface of a right underarm region of the sleeved shirt, shown in FIGS. 1 and 2.

Figure 3:
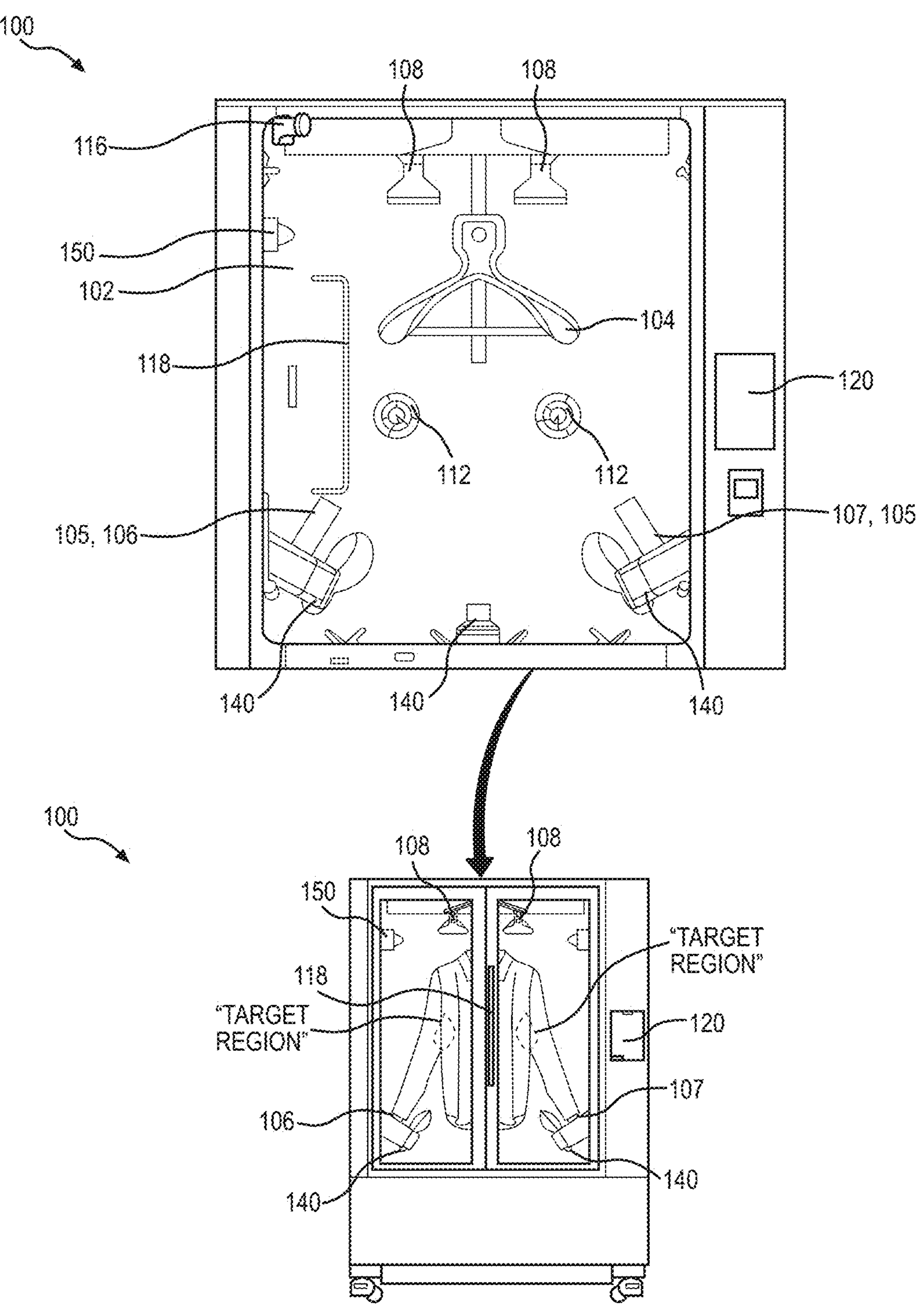
FIG. 3 is a schematic representation of a system.

In one variation, the set of fixed spray nozzles 140 are arranged below the hanger 104 and facing the garment. Each nozzle 140 is configured to expel a volume of the cleaning fluid 160 onto an exterior surface of a target region of the garment. For example, the kiosk 100 can include a left spray nozzle 140 arranged below the left sleeve retainer proximal a left side of the chamber 102 and configured to expel a volume of the cleaning fluid 160 onto an exterior surface of a left underarm area of a sleeved shirt. The kiosk 100 can further include a right spray nozzle 140 arranged below the right sleeve retainer proximal a right side of the chamber 102 and configured to expel a second volume of the cleaning fluid 160 onto an exterior surface of a right underarm area of the sleeved shirt, shown in FIG. 3.

In another implementation, the kiosk 100 can include a set of articulable spray nozzles 140: arranged on a base of the chamber 102; articulable over a range of positions; and configured to dispense volumes of the cleaning fluid 160 onto corresponding target regions of the garment via a set of nozzles 140. The kiosk 100 can execute a spray nozzle path on the garment such as by articulating the set of spray nozzles 140 along the spray nozzle path to expel volumes of the cleaning fluid 160 onto an exterior surface of the garment in a pattern corresponding to the spray nozzle path.

In yet another implementation, the kiosk 100 includes a spray nozzle 140 arranged in a wand and configured to expel a volume of the target volume of the cleaning fluid 160 over an exterior surface of the garment during manual manipulation of the wand by a user.

5.3 Sensors

The kiosk 100 further includes a camera-such as a near-infrared camera, a multispectral camera, a black light camera, a mid-infrared camera, or a depth camera-configured to capture two-dimensional images of the garment arranged within the chamber 102 of the kiosk 100. However, the camera 150 can include any other type of optical sensor and can output visual or optical data in any other format.

The kiosk 100 further includes a sensor-such as a load cell-arranged on the hanger 104 and configured to output signals corresponding to weights of garments placed on the hanger.

5.4 Retractable Clips+Bladders

The kiosk 100 also includes a set of retractable clips 108 arranged below the hanger 104 and configured to: retain a bottom edge of the garment; tension the garment against the hanger 104; and spread the base of the garment outwardly from the steam nozzle 110 arranged below the hanger 104.

The kiosk 100 can further include: a set of bladders 121 arranged in the chamber 102 and selectively expandable to stretch local areas of the garment and to obstruct openings in the garment; an air pump; and a set of pressure valves or pressure regulators configured to selectively expand and retract the set of bladders 121 by distributing air between the air pump and the set of bladders 121. For example, the kiosk 100 can include: a left shoulder bladder 124 arranged on the hanger 104 and configured to expand into a left shoulder of a garment; a right shoulder bladder 122 arranged on the hanger 104 and configured to expand into a right shoulder of a garment; a left cuff bladder arranged on the left sleeve retainer 107 and inserted into a left cuff of a first sleeve of the garment; a right cuff bladder arranged on the right sleeve retainer 106 and inserted into a right cuff of a second sleeve of the garment; and a neck bladder 123 arranged on the hanger 104 and configured to expand across a neck opening of the garment. Thus, the kiosk 100 can expand each bladder to trap moisture and heat within the garment.

5.5 Kiosk Controls

Generally, the kiosk 100 can: draw a target volume of cleaning fluid 160 from a cleaning fluid reservoir stored in the kiosk 100; trigger the set of nozzles 140 to expel volumes of the target volume of cleaning fluid 160 onto target regions of the garment; actuate the hot dryer 130 to increase a global temperature within the chamber 102; actuate the cold dryer 132 and/or the ventilation system to decrease the global temperature and humidity within the chamber 102; trigger the steam nozzle 110 to increase a temperature within the general garment and specifically in locations of steam jet impingement; trigger the steam nozzle 110 to increase pressure—and therefore stretching—in the garment at locations of steam jet impingement; trigger the steam nozzle 110 to increase humidity within the garment and in the chamber 102 more generally; and expand and contract the set of bladders 121 to increase and decrease temperature and humidity within the garment.

For example, large garment openings (e.g., neck, arm openings) may enable heat and moisture to escape the garment more rapidly during a cleaning cycle; and vice versa. The kiosk 100 can therefore selectively expand the set of bladders 121 to trap heat and moisture within the garment. Larger garments may yield greater distances between regions of the garment and the steam nozzle 110 and therefore yield reduced temperatures at locations of steam jet impingement on the garment; and vice versa. Higher steam nozzle speeds may yield lower peak temperatures at locations of steam jet impingement; and vice versa. The kiosk 100 can achieve greater local temperatures on the garment and compensate for larger garments by reducing the speed of the steam nozzle 110; and vice versa. Higher ambient temperatures within the chamber 102 may support high ambient humidities in the chamber 102 and enable the kiosk 100 to reach the transition temperature of fabric in a garment—and thus achieve wrinkle release—at higher steam nozzle speeds; and vice versa.

Furthermore, individual input parameters controlled by the kiosk 100 may affect multiple global and local conditions within the chamber 102. For example, activation of the steam nozzle 110 can increase: local temperature and humidity within the garment; chamber humidity; increase local garment pressure; and vice versa. Slower steam nozzle speeds can yield higher: local garment pressures; local garment temperatures; local humidities; and vice versa. Activation of the hot dryer 130 increases a global temperature in the chamber 102 and therefore local temperature in the garment, and activation of the cold dryer 132 decreases a global temperature in the chamber 102 and therefore local temperature in the garment. Expansion of the set of bladders 121 closes garment openings and increases internal garment temperature, internal garment humidity, and internal garment pressure; and vice versa.

The kiosk 100 can thus selectively control these actuators to achieve application of volumes of the cleaning fluid 160 onto garments and to achieve target temperatures, pressures, and humidities within garments during cleaning cycles.

6. Cleaning Fluid Parameter Selection

Blocks S110 and S120 of the method S100 recite: receiving a garment on a hanger 104 arranged within a chamber of a kiosk 100; and accessing a set of garment characteristics-including a garment type and a fabric type—of the garment.

Generally, in Blocks S110 and S120, the kiosk 100 can retrieve certain characteristics of the garment, which is loaded or is pending loading into the kiosk 100 by a user. In one example, the garment characteristics can include the garment type (e.g., a sleeved shirt, a pant, a sleeveless dress), the fabric type (e.g., cotton, polyester, wool), the garment dimensions (e.g., a weight, a surface area, a garment size), a fabric thickness (e.g., 5 millimeters), a fabric weave (e.g., an open weave/lace, a satin weave), a fabric color (e.g., white, magenta, multi-color) and/or a soil level of the garment (e.g., low, medium, high).

In preparation for loading and processing the garment, the kiosk 100 can access the set of characteristics of the garment such as a garment dimension, a garment type, a soil level, and/or a fabric type of the garment. For example, the kiosk 100 can receive a manual selection of the weight, the garment type, the fabric type, and/or the soil level of the garment entered manually by a user via a dropdown menu or image-based garment catalog rendered on a graphical user interface 120 arranged on (e.g., integrated into) the kiosk 100.

6.1 Manual Input of Garment Characteristics

In one implementation, the kiosk 100 can access the set of garment characteristics as a user input received via a user interface 120 arranged on the kiosk 100 and/or received via a user interface 120 of a mobile application installed on a mobile device of the user, the mobile device communicatively coupled to the kiosk 100. For example, the kiosk 100 can present a menu of the fabric types to the user via the user interface 120 and access the fabric type selected by the user from the fabric type menu. Furthermore, by repeatedly presenting the menu to the user, the kiosk 100 can enable the user to select a partial composition of the fabric type, such as the fabric type including 20% wool and 80% polyester.

The kiosk 100 can similarly access other garment characteristics, such as garment type or garment dimensions, by sequentially serving selection menus to the user via the user interface 120 and accessing the manual selections of the user via the user interface 120. For example, the kiosk 100 can: present a set of fabric types and a set of garment types on a user interface 120 arranged on the kiosk 100; prompt a user to select the fabric type of the garment from the set of fabric types; and prompt the user to select the garment type of the garment from the set of garment types. The kiosk 100 can then interface with the user interface 120 to receive selection of the fabric type and the garment type from the user.

Therefore, the kiosk 100 can access the set of garment characteristics, such as the fabric type, the garment type, the garment dimensions, the fabric thickness, and the garment color, manually input by the user via the user interface 120. Furthermore, the kiosk 100 can access garment characteristics including combinations of specific fabric types, fabric thicknesses, or garment colors in order to select a set of cleaning fluid 160 parameters for deodorizing, cleaning, and/or processing parameters for steaming, cleaning, and drying the garment.

6.1.1 Garment Dimension+Weight

In one variation, the kiosk 100 can access the garment weight of the garment after the garment has been placed inside the kiosk 100. Further, the hanger 104, arranged inside the kiosk 100, can include a scale configured to output the weight of the garment. Alternatively, the hanger 104 can include a load cell configured to output signals corresponding to weights of garments arranged on the hanger 104.

For example, the kiosk 100 can: access a signal from the load cell coupled to the hanger 104 arranged within the chamber 102; and interpret a weight of the garment, applied to the hanger 104, based on the signal. The kiosk 100 can then calculate a volume of the cleaning fluid 160 proportional to the weight of the garment, as further described below.

6.1.2 Manual Input of Cleanliness Level of Garment

In another variation, the kiosk 100 can access a soil level of the garment (e.g., light, normal, heavy), which may correspond to the sweat level of odorous regions of the garment, input by the user via the user interface 120. In particular, the kiosk 100 can present a menu of soil levels-such as low, medium, high, or a selectable slider of soil levels on a scale from 1 to 5—to the user via the user interface 120 and receive the soil level selected by the user from the soil level menu from the user interface 120.

For example, the kiosk 100 can: present a set of soil levels, such as "light", "normal", or "heavy", on a user interface 120 arranged on the kiosk 100; prompt the user to select a soil level of the garment from the set of soil levels; receive selection of the soil level of a first target region, such as an underarm region, of the garment from the display integrated into the kiosk 100; predict a second target region, such as back region, of the garment containing odorous molecules based on the garment type, such as a sleeved shirt; and extrapolate a volume of the cleaning fluid 160 for application onto the back region of the garment based on the soil level and the fabric type. Alternatively, the kiosk 100 can: receive selection of a second soil level, such as "light", of the back region of the garment from the display, the second soil level different from the first soil level; and calculate the volume of the cleaning fluid 160 for application onto the back region of the garment less than the first volume of the cleaning fluid for application onto the underarm region based on the second soil level.

Thus, the kiosk 100 can allocate volumes of the cleaning fluid 160 to preferentially apply to select regions of the garment that exhibit the greatest areas of odorous molecules based on the garment type, the fabric type, and/or the soil level of the garment.

6.2 Automatic Detection of Garment Characteristics

In one implementation, the kiosk 100 can automatically detect the set of garment characteristics based on images captured by a camera 150 140 arranged within the chamber 102 of the kiosk 100 or arranged on the side of the kiosk 100. For example, prior to receiving the garment, the kiosk 100 can: detect the garment type of the garment based on an image captured by a first camera 150 arranged on an outer side of the kiosk 100, such as above the kiosk 100 door 118; based on the garment type, retrieve instructions for loading the garment type into the kiosk 100; and serve these instructions to the user. Then, after the garment has been loaded into the kiosk 100, the kiosk 100 can detect the garment dimensions based on a second image captured by a second camera 150 arranged within the chamber 102.

In one variation, the kiosk 100 can: detect a set of edge features, representing an outline of the garment, in the second image. For example, to detect the set of edge features, the kiosk 100 can apply image processing techniques, such as filtering, gradient calculation, and thresholding, to identify discontinuities in brightness in the second image, the discontinuities corresponding to the set of edge features. Then, based on the set of edge features, the kiosk 100 can: interpret a perimeter of a torso section of the garment; detect a pixel count of an area of the second image bound by the perimeter; and calculate the garment dimension including a surface area of the torso section of the garment based on the pixel count. The kiosk 100 can further convert the surface area of the garment to a garment size, such as small, medium, or large. Therefore, the kiosk 100 can automatically detect the garment dimensions, such as the surface area or the garment size, based on the pixel count of the garment torso depicted in the image captured by the camera 150.

6.2.1 Stain Area Detection

In another variation, the kiosk 100: includes a multispectral camera 150 configured to capture images of the garment and derives a cleanliness level of the garment (e.g., light, normal, heavy), which may correspond to the sweat level or the soil level of odorous regions of the garment, from these images.

For example, the kiosk 100 can implement methods and techniques described above to detect a set of edge features, representing an outline of the garment, in the image; and apply image processing techniques to identify discontinuities in brightness in the image. Based on the set of edge features, the kiosk 100 can: interpret a perimeter of a first sleeve section of the garment; detect a pixel count of a stain area on the garment within the perimeter of the first sleeve section; and calculate a dimension (e.g., a size) of the stain area based on the pixel count of the stain area. The kiosk 100 can repeat these methods and techniques for a second sleeve section of the garment and calculate a second dimension of a second stain area on the second sleeve section of the garment based on a combination (e.g., an average) of the dimensions of both stain areas of the garment.

Therefore, the kiosk 100 can automatically detect a stain area on a garment and derive a dimension of the stain area, which may correspond to odorous molecules on the garment. The kiosk 100 can store the dimension as a pre-cleaning dimension for the stain area on the garment.

6.2.2 Autonomous Detection: Fabric Type+Identifier

In one variation, the kiosk 100 includes a near-infrared camera 150 configured to capture images of the garment in the near-infrared spectrum and identifies the fabric type of the garment placed inside the kiosk 100 based on the stretching vibration of hydrogen groups represented in these images.

In another variation, the kiosk 100 includes a two-dimensional color camera 150 configured to capture images of the garment and identify the fabric type, the garment type, and/or the garment size from an identifier (e.g., a clothing tag, a clothing label, a RFID tag, a barcode) arranged on the garment. For example, the kiosk 100 can: trigger a camera 150 arranged in the kiosk 100 to capture an image of the garment; detect a tag on the garment in a region of the image; extract a set of features, representing textual characteristics, from the region of the image; and, based on the set of features, identify a fabric type of the garment specified by the tag and identify the garment type of the garment specified by the tag.

Therefore, the kiosk 100 can automatically detect the garment characteristics, such as the garment type and the garment dimensions, based on images of the garment captured by one or more cameras 150 arranged in the kiosk 100. By automatically detecting the garment characteristics, the kiosk 100 can forgo accessing manual user input, thereby reducing the setup time duration associated with manual user input of the garment characteristics and eliminating potential for human error, as the user may input incorrect garment characteristics. By reducing the setup time duration and eliminating user involvement in identification of the garment characteristics, the kiosk 100 can improve user experience and quickly execute a cleaning cycle.

7. Defining the Target Volume of the Cleaning Fluid

Generally, prior to the cleaning cycle, the kiosk 100 can calculate a target volume of the cleaning fluid 160 to preferentially apply to select regions of the garment based on the garment weight, garment type, and/or fabric type of the garment. Therefore, the kiosk 100 can calculate the target volume of the cleaning fluid 160 to clean the garment, the target volume dependent on the garment characteristics.

In one implementation, the kiosk 100 can calculate a target volume of cleaning fluid 160 proportional to a weight of the garment (e.g., because heavier garments may require more cleaning fluid 160). For example, the target volume of the cleaning fluid 160 can be equivalent to 10% of the weight of the garment.

In another implementation, the kiosk 100 can calculate a target volume of the cleaning fluid 160 to preferentially apply to select regions of the garment based on the fabric type of the garment. For example, for garments composed of silk, the kiosk 100 can calculate a target volume of cleaning fluid 160, less than a target volume defined for a similar-sized garment composed of thick cotton (e.g., a medium silk shirt and a medium cotton shirt).

7.1 Targeted Portioning of the Cleaning Fluid

Block S130 of the method S100 recites: allocating a first volume of the target volume of the cleaning fluid 160 for application on a first target region of the garment, predicted to contain odorous molecules based on the garment type, based on the fabric type. Generally, in Block S130 the kiosk 100 can specify a volume of the cleaning fluid 160 to apply to a corresponding target region of the garment via the set of nozzles 140.

In one implementation, based on the garment type, the kiosk 100 can: allocate a first volume of the cleaning fluid 160 for application onto a first target region (e.g., an underarm area) of the garment; and allocate a second volume of the cleaning fluid 160 for application onto a second target region (e.g., an interior surface) of the garment. For example, for a dress shirt, the kiosk 100 can designate 50% of the target volume of the cleaning fluid 160 for application onto the underarm area and 50% of the target volume of the cleaning fluid 160 for application onto the interior surface of the dress shirt. However, for a cardigan, the kiosk 100 can designate 15% of the target volume of the cleaning fluid 160 for application onto the underarm area and the remaining 85% of the target volume of the cleaning fluid 160 for application onto the interior surface of the cardigan. For garments such as ties, hats, scarves, or gloves, the kiosk 100 can designate 100% of the target volume of the cleaning fluid 160 for application onto the exterior surface of the garment.

Alternatively, the kiosk 100 can allocate a first volume of the target volume of the cleaning fluid 160 for application onto a first target region, such as a left underarm area, of the garment; and allocate a second volume of the target volume of the cleaning fluid 160 for application onto the second target region, such as a right underarm area, of the garment. For example, for a dress shirt, the kiosk 100 can: allocate 25% of the target volume of the cleaning fluid 160 for application onto the left underarm area; allocate 25% of the target volume of the cleaning fluid 160 for application onto the right underarm area of the dress shirt; and 50% of the target volume of the cleaning fluid 160 for application onto an interior surface of the dress shirt.

Furthermore, in order to apply the cleaning fluid 160 to regions of the garment that are most likely to be soiled (e.g., dirty, stained), the kiosk 100 can allocate any other proportion of the target volume to apply to any other region of the garment including: an interior surface of the garment; an underarm area of the garment; an exterior surface of the garment; sleeves of the garment; a collar of the garment; and/or a hem of the garment etc. For example, for a garment such as a coat, the kiosk 100 can designate 30% of the target volume of the cleaning fluid 160 for application onto the sleeves of the coat, 10% of the target volume for application onto the collar of the coat, 30% of the target volume for application onto the hem of the coat, and 30% of the target volume for application onto the exterior surface of the coat.

7.2 Allocation of Cleaning Fluid: Discrete Weights+Garment Types

The kiosk 100 can further allocate volumes of the cleaning fluid for application onto target regions of the garment according to the garment type and/or the weight of the garment.

In one implementation, the kiosk 100: identifies a target region predicted to contain odorous molecules according to the garment type of the garment; calculates a volume of cleaning fluid proportional to the weight of the garment; and assigns the volume of cleaning fluid to the target region.

For example, the kiosk can: access a signal from the load cell coupled to the hanger 104; interpret a first weight of the garment, such as 100 grams, based on the signal; receive selection of a garment type, such as a dress shirt type, from a user via a display integrated into the kiosk 100; identify a target region, such as an underarm region, predicted to contain odorous molecules, based on the dress shirt type; and calculate a volume of the cleaning fluid proportional to the weight of the garment, such as 10 grams. The kiosk 100 can further: receive a second garment on the hanger arranged within the chamber 102; access a second signal from the load cell coupled to the hanger 104; interpret a second weight of the second garment, such as 200 grams, based on the second signal; and receive selection of a second garment type, such as the dress shirt type, from the user via the display integrated into the kiosk 100.

Then, in response to the second weight (e.g., 200 grams) exceeding the first weight (e.g., 100 grams) and in response to the second garment type approximating (e.g., matching, analogous to) the first garment type, the kiosk 100 can: identify a second target region of the second garment, such as a second underarm region, predicted to contain odorous molecules based on the dress shirt type; calculate a second volume of cleaning fluid, such as 20 grams, greater than the first volume of cleaning fluid; and allocate the second volume of cleaning fluid for application onto the second underarm region of the second garment.

Therefore, the kiosk 100 can: allocate a volume of cleaning fluid for a target region of a garment proportional to the weight of the garment and interpret a weight difference between a set of garments. Additionally, the kiosk 100 can selectively increase a volume of the cleaning fluid allocated to a larger, heavier garment and/or selectively decrease the volume of the cleaning fluid allocated to a smaller, lighter garment of a similar garment type.

7.3 Allocation of Cleaning Fluid: Discrete Garment Types+Weights

Alternatively, the kiosk 100 can allocate volumes of the cleaning fluid to target regions of two discrete garments exhibiting a similar weight and selectively increase and/or decrease the volume of the cleaning fluid according to the garment type of each garment. In the foregoing example, the kiosk 100 can: receive a second garment on the hanger 104 arranged within the chamber 102; access a second signal from the load cell coupled to the hanger; interpret a second weight of the second garment, such as 100 grams, based on the second signal; and receive selection of a second garment type, such as a sleeveless shirt type, from the user via the display integrated into the kiosk 100.

Then, in response to the second weight (e.g., 100 grams) approximating the first weight (e.g., 100 grams) and in response to discordance between the second garment type (e.g., sleeveless shirt type) and the first garment type (e.g., a sleeved shirt type), the kiosk 100 can: identify a second target region of the second garment, such as a neck-line region, based on the sleeveless shirt type; calculate a second volume of cleaning fluid, such as 5 grams, less than the first volume of cleaning fluid, such as 10 grams; and allocate the second volume of cleaning fluid for application onto the neckline region of the second garment.

7.4 Allocation of Cleaning Fluid: Fabric Type

The kiosk 100 can further allocate volumes of the cleaning fluid to target regions of discrete garments exhibiting a similar weight and implement methods and techniques described above to selectively increase and/or decrease the volume of the cleaning fluid according to the fabric type of each garment.

7.2 Defining Cleaning Fluid Target Properties: Viscosity, Wetting, pH

In one implementation, the kiosk 100 can select a target formulation of the cleaning fluid 160 that is assigned to a particular fabric type of the garment. In particular, based on the fabric type of the garment, the kiosk 100 can select the target formulation of the cleaning fluid 160 to apply to the garment, the target formulation associated with a set of target properties including viscosity of the cleaning fluid 160, pH of the cleaning fluid 160, and/or wetting properties (e.g., foaming, emulsifying, dispersing, cleaning). In one example, the kiosk 100 may select a second target formulation of the cleaning fluid 160 to be applied to a garment composed of silk fabric, the second target formulation having a relatively low viscosity (e.g., viscosity less than the first viscosity). In another example, for a garment composed of wool fabric, the kiosk 100 can select a third target formulation of the cleaning fluid 160 with a relatively high pH (e.g., compared to pH for a cotton garment).

8. Cleaning Fluid Application

Block S140 of the method S100 recites: dispensing the first volume of the cleaning fluid onto the first target region of the garment via a first nozzle to modify odorous molecules in the first target region of the garment and perfume the garment in Block S140. Additionally, Block S142 of the method S100 recites: dispensing a second volume of the cleaning fluid 160 onto the second target region of the garment via a second nozzle to modify odorous molecules in the second target region of the garment and perfume the garment.

Generally, in Blocks S140 and S142, the kiosk 100 can dispense volumes of the cleaning fluid 160 onto target regions of the garment—such that Zinc ricinoleate modifies odorous molecules in these target regions of the garment and fragrance is dispersed onto the garment—via the set of nozzles 140. In particular, the kiosk 100 can dispense volumes of the cleaning fluid 160 onto target regions of the garment—such that Zinc ricinoleate chemically binds to odorous molecules in these target regions of the garment, chemically modifies the molecular structure of these odorous molecules, and fragrance is dispersed onto the garment—via the set of nozzles 140.

In one implementation, during the cleaning cycle, the kiosk 100 draws the first volume of the cleaning fluid 160 from a cleaning fluid reservoir through a nozzle 140 (e.g., an aerosolizing nozzle, a spray nozzle) directed toward the first target region of the garment to: locally apply Zinc ricinoleate, within the cleaning fluid 160, to the first target region of the garment to modify odorous molecules in the first target region of the garment; and distribute fragrance onto the first target region of the garment. Additionally, during the cleaning cycle, the kiosk 100 draws the second volume of the target volume of the cleaning fluid 160 from the cleaning fluid reservoir through a second nozzle 140 (e.g., an aerosolizing nozzle, a spray nozzle) directed toward the second target region of the garment to: locally apply Zinc ricinoleate, within the cleaning fluid 160, to the second target region of the garment to modify odorous molecules in the second target region of the garment; and distribute fragrance onto the second target region of the garment. Therefore, the kiosk 100 can apply the cleaning fluid 160 to two discrete target regions of the garment through the set of nozzles 140.

In one variation, during the cleaning cycle, the kiosk 100: draws the target volume of the cleaning fluid 160 from the cleaning fluid reservoir, such as a storage tank inside the kiosk 100; triggers a nozzle 140, in the set of nozzles 140, arranged on the hanger 104 inside the kiosk 100, to expel the first volume of the target volume of the cleaning fluid 160 onto an interior surface of a right-hand underarm area of the garment; and triggers a second nozzle 140, in the set of nozzles 140, arranged on the hanger 104 inside the kiosk 100, to expel a second volume of the target volume of the cleaning fluid 160 onto an interior surface of a left-hand underarm area of the garment. In this example, the kiosk 100 further triggers a third nozzle 140, in the set of nozzles 140, arranged on a servo-motor system, to: advance upwardly within the garment and along a vertical axis; rotate the third nozzle 140 about the vertical axis; and expel a third volume of the target volume of cleaning fluid 160 across the interior surface of the garment.

In one example, during the cleaning cycle, the kiosk 100: accesses the weight, such as 200 grams, and the garment type of the garment, such as pants; calculates a volume of the cleaning fluid 160, such as 20 grams, according to the weight of the pants; draws the volume of the cleaning fluid 160 from a cleaning fluid reservoir arranged in the kiosk 100; and triggers a nozzle 140 (e.g., an articulable nozzle) arranged on a side of the kiosk 100 and facing the pants, to expel the volume of the cleaning fluid 160 onto an exterior surface of a target region of the pants, such as the bottom edge of the pants.

Therefore, the kiosk 100 can apply volumes of the cleaning fluid 160 to discrete target regions of the garment through a set of nozzles 140 arranged on the hanger 104 in the chamber 102, a nozzle 140 arranged on a base of the chamber 102, and/or a set of nozzles 140 arranged on sides of the chamber 102 and below the hanger 104.

8.1 Garment-specific Formulation of Cleaning Fluid

In another implementation, during the cleaning cycle, the kiosk 100 draws the target volume of cleaning fluid 160 from the cleaning fluid reservoir associated with the fabric type of the garment. In particular, the kiosk 100 draws the target volume of the cleaning fluid 160 from the cleaning fluid reservoir, in a set of cleaning fluid reservoirs, storing various formulations of the cleaning fluid 160 for a set of common fabric types (e.g., cotton, silk, polyester, nylon); and triggers a set of nozzles to aerosolize the volume of the cleaning fluid 160 and expel the volume of the cleaning fluid 160 onto the garment to apply a garment-specific formulation of the cleaning fluid 160 to the garment.

For example, the kiosk 100 can: access the weight, the garment type, and the fabric type of the garment, such as a 100 gram sleeved shirt (e.g., blouse) with silk fabric, arranged on the hanger 104 via the user interface 120; draw the target volume of the cleaning fluid 160 from a cleaning fluid reservoir, in the set of cleaning fluid reservoirs, associated with the silk fabric type and arranged in the kiosk 100; trigger a left nozzle, in a set of nozzles, arranged on a left side of the hanger 104 in the kiosk 100, to expel a first volume of the target volume of cleaning fluid 160 onto a right-hand underarm area of the sleeved shirt; and trigger the second nozzle 140, in the set of nozzles, arranged on a right side of the hanger 104, to expel a second volume of the target volume of the cleaning fluid 160 onto a left-hand underarm area of the sleeved shirt. Thus, the kiosk 100 can apply a garment-specific formulation of the cleaning fluid 160 to the sleeved shirt that corresponds to the silk fabric type of the garment.

8.2 Articulable Nozzle Cleaning Fluid Application

In another implementation, during the cleaning cycle, the kiosk 100 can: orient a nozzle 140 (e.g., aerosolizing nozzle) toward the first target region of the garment and draw a volume of the cleaning fluid 160 from the cleaning fluid reservoir through the nozzle 140 to: locally apply Zinc ricinoleate, within the cleaning fluid 160, to a target region of the garment to modify odorous molecules in the target region of the garment; and distribute fragrance onto the target region of the garment.

The kiosk 100 can further: orient the nozzle 140 toward the second target region of the garment and draw a second volume of the cleaning fluid 160 from the cleaning fluid reservoir through the nozzle 140 to locally apply Zinc ricinoleate, within the cleaning fluid 160, to the second target region of the garment to modify odorous molecules in the second target region of the garment and distribute fragrance onto the second target region of the garment. Therefore, the kiosk 100 can apply the cleaning fluid 160 to two discrete target regions of the garment by articulating one nozzle 140 to the first target region at a first time during the cleaning cycle and to the second target region at a second time during the cleaning cycle.

In one variation, the kiosk 100: draws the target volume of the cleaning fluid 160 from a cleaning fluid reservoir arranged in the kiosk 100; directs the first nozzle 140, arranged in the chamber 102 of the kiosk 100 and below the garment, to face the first target region of the garment; and triggers the first nozzle 140 to expel the first volume of the cleaning fluid 160 onto the first target region of the garment. The kiosk 100 then: directs the first nozzle 140 to face the second target region of the garment; and triggers the first nozzle 140 to expel the second volume of the cleaning fluid 160 onto the second target region of the garment.

Therefore, the kiosk 100 can apply volumes of the cleaning fluid 160 to discrete target regions of the garment through a single articulable nozzle 140 arranged on a base of the chamber 102 rather than a set of fixed nozzles 140 arranged on the hanger 104 in the chamber 102 or sides of the chamber 102.

8.3 Bladder Manipulation

Generally, during the cleaning cycle, the kiosk 100 can manipulate the air pressure within each bladder to preferentially direct volumes of the cleaning fluid 160 between target regions of the garment.

In one implementation, the kiosk can: expand a left shoulder bladder into a left shoulder of the garment via the pressure regulator; dispense a portion of a volume of the cleaning fluid 160 onto the interior surface of the left armpit region of the garment via the nozzle 140; deflate the left shoulder bladder from the left shoulder of the garment via the pressure regulator; and dispense a remaining portion of the volume of the cleaning fluid 160 onto the interior surface of the left sleeve of the garment via the nozzle 140. The kiosk can repeat the methods and techniques described above for a right shoulder bladder to deodorize the garment.

For example, during a first duration (e.g., 20 seconds) of the cleaning cycle, the kiosk 100 can: via the pressure regulator, distribute a first volume of air from the air pump to the left shoulder bladder to direct cleaning fluid 160 onto an interior surface of a left armpit area of a left sleeve of the garment by the nozzle 140; and via the nozzle 140, dispense the first volume of the cleaning fluid 160 onto the interior surface of the left armpit area of the left sleeve of the garment. Then, during a second duration (e.g., 10 seconds) of the cleaning cycle, the kiosk 100 can: via the pressure regulator, distribute a second volume of air, less than the first volume of air, from the air pump to the left shoulder bladder to deflate the left shoulder bladder and direct the first volume of the cleaning fluid 160 onto the remaining interior surface of the left sleeve by the nozzle 140; and via the nozzle 140, concurrently dispense a remaining volume of the cleaning fluid 160 onto the interior surface of the left sleeve of the garment. The kiosk 100 can: via the steam nozzle 140 110, expel a steam jet across the interior surface of the garment, tension local regions of the garment, and locally heat regions of the garment above a transition temperature; and cool the garment below the target garment temperature to set the garment in an unwrinkled state.

Therefore, the kiosk 100 can manipulate the air pressure within each bladder to: direct cleaning fluid between target regions of the garment during the cleaning cycle; trap moisture within the garment, and trap heat within the garment. Additionally, the kiosk 100 can thus control local temperatures and humidities within the garment during a processing cycle by selectively: expanding a bladder to close the garment opening and thus increase the temperature and humidity inside the garment; and retracting the bladder to unblock the garment opening and thus reduce the temperature and humidity within the garment.

8.4 Manual Application of the Cleaning Fluid via a Hand-held Nozzle

In one implementation, prior to the cleaning cycle, the kiosk 100 can execute Blocks of the method S100: to allocate a volume of the cleaning fluid 160 for manual application onto the garment during the cleaning cycle based on the fabric type; and trigger a nozzle 140, arranged in a wand, to dispense the volume of the cleaning fluid 160 to an exterior surface of the garment during manual manipulation of the wand by a user.

For example, the kiosk 100 can allocate a volume of the cleaning fluid 160 for manual application onto the garment during the cleaning cycle based on the fabric type. Then, during manual manipulation of a wand over an exterior surface of the garment, the kiosk 100 can trigger the nozzle 140, arranged in the wand, to: locally apply Zinc ricinoleate, within the cleaning fluid 160, to an exterior surface of the garment to modify odorous molecules in the exterior surface of the garment; and distribute the fragrance, within the cleaning fluid 160, onto the exterior surface of the garment.

9. Adjusting Temperature+Humidity Inside the Kiosk

Generally, the kiosk 100 can identify a target chamber temperature and a target chamber humidity based on the garment weight, garment type, and/or fabric type of the garment. Then, during the cleaning cycle, the kiosk 100 can actuate a set of dryers and/or a heater to drive a temperature in the chamber 102 of the kiosk 100 toward the target chamber temperature and activate the steam nozzle 110 to drive a chamber humidity in the chamber 102 toward the target chamber humidity via release of steam. Therefore, the kiosk 100 can adjust the conditions inside the chamber 102 to facilitate wrinkle-release of the fabric of the garment.

In one implementation, prior to the cleaning cycle, the kiosk 100 can identify a target chamber temperature and a target chamber humidity based on the garment weight, garment type, and fabric type of the garment and the target volume of cleaning fluid 160 to apply to the garment. Because the target chamber temperature and humidity are associated with a transition temperature of the garment and because the transition temperature of the garment can be lowered by applying cleaning fluid 160 to the garment, the garment that receives greater target volume of cleaning fluid 160 may have a lower transition temperature and, therefore, can be exposed to a lower target temperature inside the chamber 102. Furthermore, a garment that receives a large target volume of cleaning fluid 160 can become saturated with moisture and, therefore, can reach the transition temperature without exposure to high target humidity in the chamber 102. Therefore, the kiosk 100 can define the target temperature and target humidity of the chamber 102 based, in part, on allocated volumes of the cleaning fluid 160 applied onto the garment.

In one variation, the kiosk 100, actuates a heater to drive a temperature of air in the chamber 102 of the kiosk 100 toward a target chamber temperature and articulates the steam nozzle 110 to drive a humidity in the chamber 102 toward a target chamber humidity. Thus, the kiosk 100 can pre-heat and apply moisture to the garment, prior to application of volumes of the cleaning fluid 160 onto target regions of the garment.

In another variation, during the cleaning cycle, the kiosk 100 dispenses a volume of the cleaning fluid 160 onto a target region of the garment via a spray nozzle 140 to bind odorous molecules in the target region of the garment and inject a scent into fabric of the garment. The kiosk 100 then articulates the steam nozzle 110 to apply steam across the interior surface of the garment and increase a binding rate of cleaning fluid 160 to odorous molecules in target regions of the garment.

Alternatively, the kiosk 100: dispenses a volume of the cleaning fluid 160 onto a target region of the garment via a spray nozzle 140 to modify a molecular structure of odorous molecules in the target region of the garment; and articulates the steam nozzle 110 to apply steam across the interior surface of the garment and increase a modification rate of cleaning fluid 160 to modify odorous molecules in target regions of the garment. In particular, the proportion of Zinc ricinoleate, within the cleaning fluid 160, chemically bonds to odorous molecules in target regions of the garment, modifies a molecular structure of these odorous molecules, neutralizes odorous molecules in target regions of the garment, and thus deodorizes the garment.

9.1 Steam Treatment and Cooling of the Garment

Blocks S150 and S160 of the method S100 recite: articulating the steam nozzle 110, facing an interior surface of the garment to expel a steam jet across the interior surface of the garment, tension local regions of the garment, and locally heat regions of the garment above a transition temperature; and cooling the garment below the transition temperature to set the garment in an unwrinkled state. Generally, in Blocks S150 and S160, the kiosk 100 can trigger the steam nozzle 110 to impinge a steam jet across the interior surface of the garment to transition fabric of the garment into a pliable state and actuate a set of dryers to cool the garment and set the fabric in an unwrinkled state (e.g., a wrinkle-free state).

In particular, during the cleaning cycle, the kiosk 100 can articulate a steam nozzle 110, facing the interior surface of the garment to: expel a steam jet across the interior surface of the garment; tension local regions of the garment; and locally heat regions of the garment above a transition temperature to transition a polymerous matrix of fabric of the garment into a pliable state. Then, the kiosk 100 can actuate the set of dryers to cool the garment below the transition temperature to set the polymerous matrix of fabric of the garment in an unwrinkled state.

In one implementation, during the cleaning cycle, the kiosk 100 implements methods and techniques described in U.S. patent application Ser. No. 18/582,637: to define a target garment temperature exceeding a transition temperature associated with a fabric type of the garment; to select a target humidity associated with the fabric type; to actuate a set of dryers and/or a set of heaters to heat a temperature of air within the chamber 102 toward a target chamber temperature; and to actuate the steam nozzle 110 to drive a humidity in the chamber 102 toward the target humidity. The kiosk 100 further articulates the steam nozzle 110, facing an interior surface of the garment, to: expel a steam jet across the interior surface of the garment; tension local regions of the garment; and locally heat regions of the garment to a target garment temperature. The kiosk 100 then actuates the set of dryers (e.g., cold dryers) to cool the garment below the target garment temperature to set the garment in an unwrinkled state.

Therefore, the kiosk 100 can apply pressurized steam to the garment to facilitate a transition of the garment fabric from a wrinkled state to an unwrinkled state ensuring that the garment will remain unwrinkled over a period of time, such as a day or a week, following a cleaning cycle. Thus, by driving a temperature of the garment below the target garment temperature, the kiosk 100 can set the garment in a lasting unwrinkled state.

10. Closed-Loop Controls: Processing Models

Generally, the kiosk 100 can access a pre-cleaning image of the garment and calculate a dimension (e.g., a size) of a stain area, corresponding to an odorous region, on the garment based on features detected in the pre-cleaning image. Then, upon termination of the cleaning cycle, the kiosk 100 can access a post-cleaning image of the garment and calculate a dimension (e.g., a size) of the stain area of the garment based on features detected in the post-cleaning image. The kiosk 100 can then identify reduction of the stain area, which may indicate odor removal from the stain area on the garment, or initiate a new cleaning cycle to reduce the dimension of the stain area.

Figure 6:
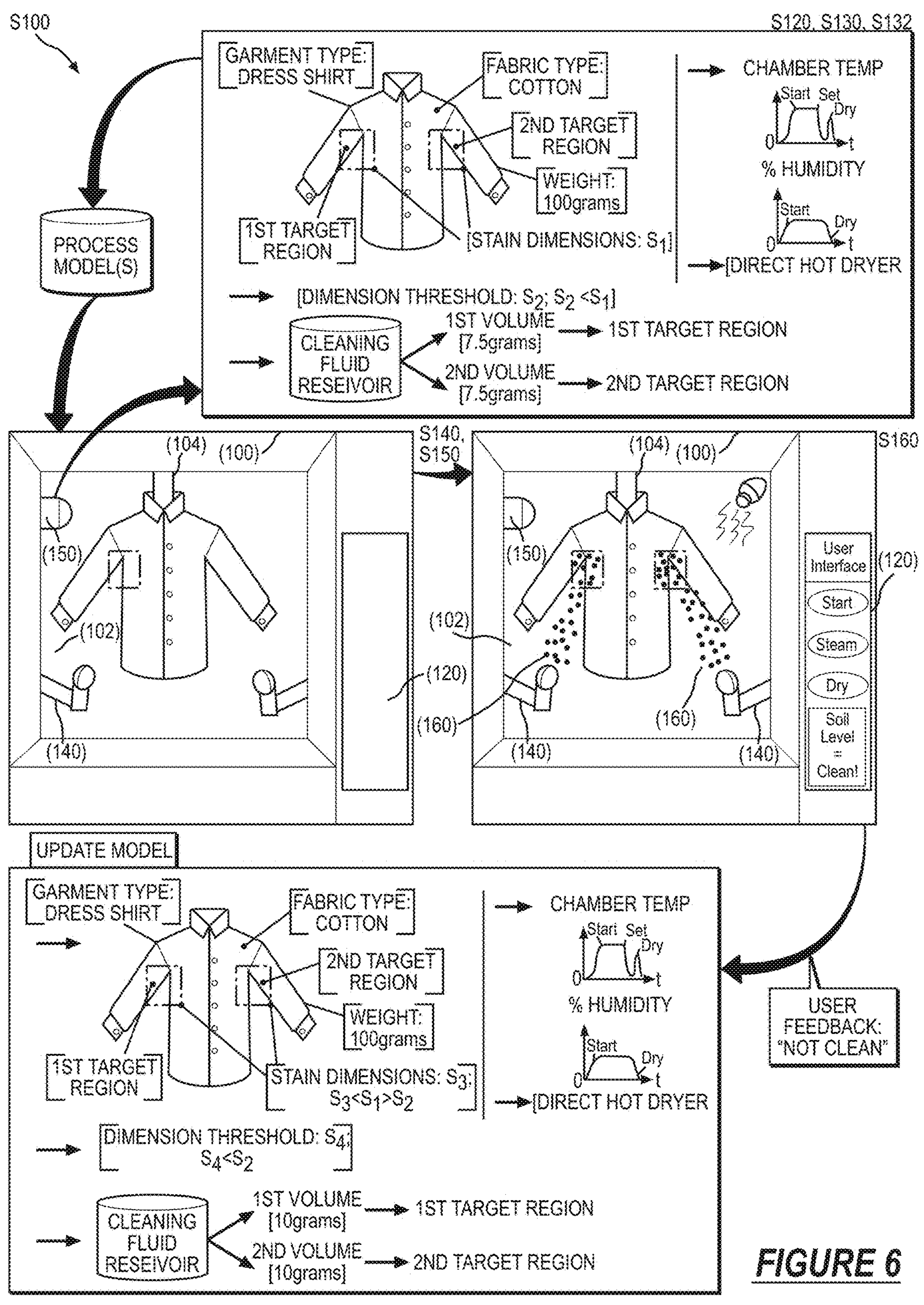
FIG. 6 is a flowchart representation of one variation of the method.

In particular, the kiosk 100 can present the post-cleaning dimension of the stain area to the user via the user interface 120 and receive feedback from the user. The kiosk 100 can then selectively identify reduction of the stain area and confirm odor reduction in the stain area on the garment or initiate a new cleaning cycle for the garment based on the user's feedback. The kiosk 100 can then define a threshold dimension for stain areas of the garment associated with the garment type, fabric type, and/or weight of the garment and store this threshold dimension in a processing model, shown in FIG. 6.

More specifically, the kiosk 100 can implement a set of processing models—described in U.S. patent application Ser. No. 18/582,637—that define target chamber temperatures, target chamber humidities, steam nozzle paths, steam nozzle speeds, bladder actuation specifications, garment retention specifications, and/or target volumes of the cleaning fluid 160, etc. based on garment characteristics such that implementing these input parameters yields target temperatures, pressures, humidities, and stain area dimensions predicted to achieve odor reduction and complete wrinkle release of fabric of these garments.

In one implementation, the kiosk 100 stores and implements one non-parameterized processing model for each fabric type, garment type, and/or soil level. For example, a processing model for a large cotton dress shirt can define setup parameters including bladder actuation (e.g., target internal pressures for each bladder) and a target clip layout on the garment, such as including graphical and/or textual instructions for a user. In this example, the processing model can also define cleaning parameters, including: volumes of the cleaning fluid 160 for application onto target regions of the dress shirt; a steam nozzle path (e.g., starting position, ellipsoid-spiral pattern, ending position, stepover offset between turns of the spiral pattern); a steam nozzle speed, such as for individual segments of the steam nozzle path; hot and cold dryer 132 actuation and timing; target chamber temperatures and humidities, such as at key times during a processing cycle; drying parameters, including hot or cold air from the hot or cold dryer 132 and direct or indirect drying; ventilation settings (e.g., timing for exhausting and recirculate moist air in the chamber 102); and a target or threshold stain area dimension indicating odor reduction from the cotton dress shirt.

10.1 Reduction of Stain Area+Odorous Molecules

Figure 5:
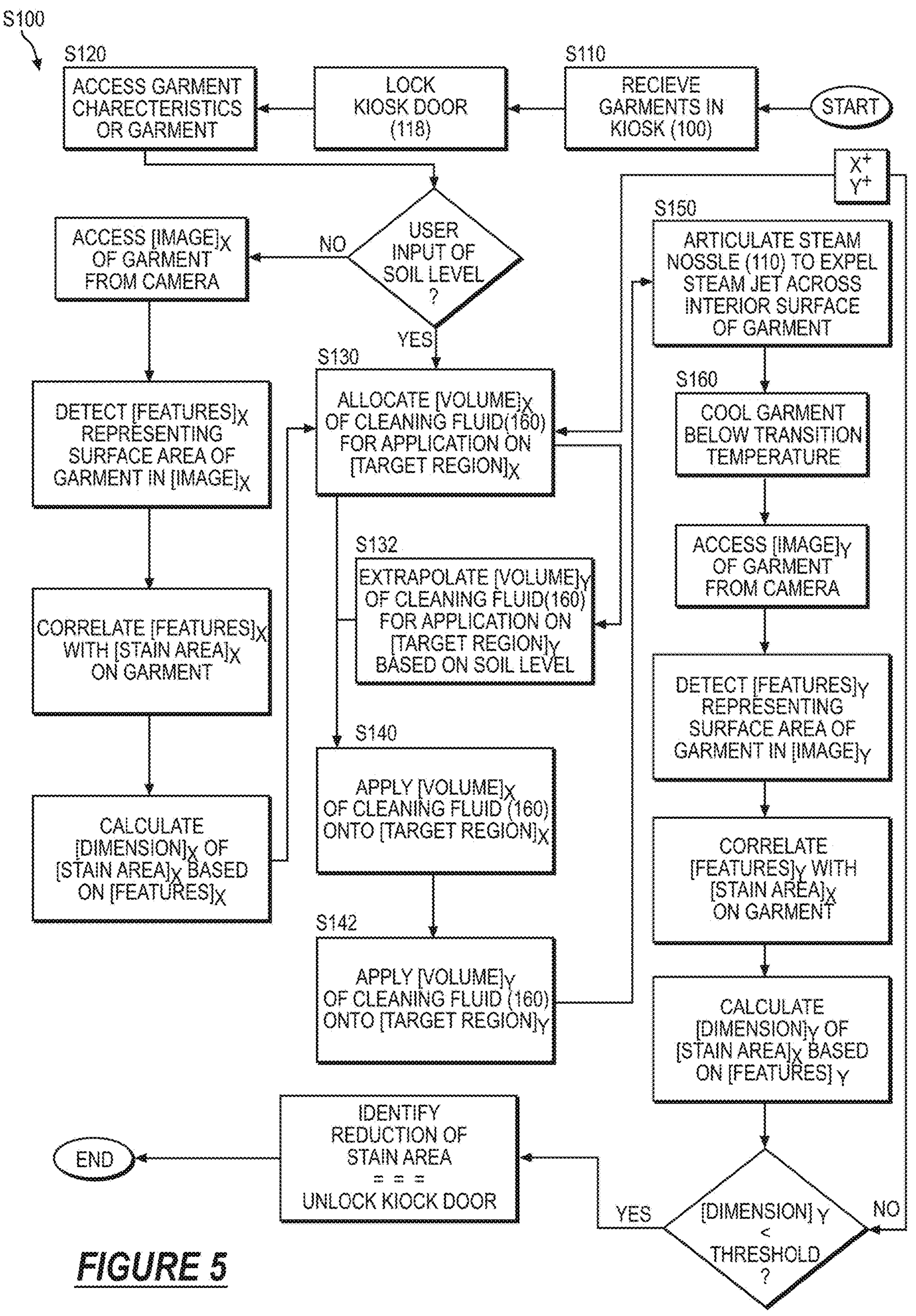
FIG. 5 is a flowchart representation of one variation of the method.

In one implementation, the kiosk 100 accesses a post-cleaning image of the garment and characterizes a dimension of a stain area on the garment based on features detected in the image. Responsive to the dimension falling below a threshold dimension, the kiosk 100: identifies reduction of the stain area on the garment during the cleaning cycle; terminates the cleaning cycle; unlocks the kiosk door 118;

and prompts the user to retrieve the garment from the kiosk 100, thereby completing the cleaning cycle, shown in FIG. 5.

In one variation, the kiosk 100: triggers the camera 150 to capture a post-cleaning image of the garment; detects a set of features, representing the surface area of the garment, in the post-cleaning image; correlates the set of features with the stain area on the garment; calculates a post-cleaning dimension of the stain area based on the set of features, the post-cleaning dimension less than a pre-cleaning dimension of the stain area; and retrieves a threshold dimension for stain areas from a processing model associated with the garment type and/or fabric type of the garment. Then, in response to the post-cleaning dimension of the stain area falling below a threshold dimension (e.g., defined in), the kiosk 100: identifies reduction of the stain area of the garment; terminates the cleaning cycle; unlocks the kiosk door 118; and prompts the user to retrieve the garment from the chamber 102 via the display integrated into the kiosk 100.

10.2 Next Cleaning Cycle

In one implementation, the kiosk 100 accesses a post-cleaning image of the garment and characterizes a dimension of a stain area on the garment based on features detected in the image. Responsive to the dimension falling below a threshold dimension, the kiosk 100 initiates a next cleaning cycle and executes Blocks of the method S100 in order to reduce the dimension of the stain area and reduce odorous molecules in the garment-such that a user may perceive the garment as clean.

For example, the kiosk 100 can: detect a difference between the dimension of the stain area and the threshold dimension for stain areas; allocate a volume of the cleaning fluid 160 for application on the first target region of the garment based on the garment type and the difference between the dimension of the stain area and the threshold dimension; and define a second volume of the cleaning fluid 160 for application onto the second target region of the garment based on the garment type and the difference between the dimension of the stain area and the threshold dimension. The kiosk 100 can then initiate a next cleaning cycle for the garment and update the processing model for this garment with the new volumes of the cleaning fluid 160 for this cleaning cycle.

Therefore, the kiosk 100 can implement one or a suite of processing models to derive target volumes of the cleaning fluid 160, target temperatures, pressures, humidities, and threshold dimensions of stain areas, for a garment based on characteristics of the garment. In particular, a processing model can define a set or sequence of processing parameters predicted to achieve reduction in stain areas on the garment and complete wrinkle release from the garment based on the fabric type, garment type, garment dimensions, and/or other characteristics of the garment.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:

receiving a garment on a hanger arranged within a chamber of a kiosk;

accessing a set of garment characteristics of the garment, the set of garment characteristics comprising a garment type and a fabric type;

allocating a first volume of a cleaning fluid for application on a first target region of the garment, predicted to contain odorous molecules based on the garment type, based on the fabric type; and during a cleaning cycle:

dispensing the first volume of the cleaning fluid onto the first target region of the garment via a first nozzle to:

modify odorous molecules in the first target region of the garment; and perfume the garment;

articulating the first nozzle, facing an interior surface of the garment to:

expel a steam jet across the interior surface of the garment;

tension local regions of the garment; and locally heat regions of the garment above a transition temperature; and cooling the garment below the transition temperature to set the garment in an unwrinkled state.

2. The method of claim 1:

wherein dispensing the first volume of the cleaning fluid onto the first target region comprises dispensing the first volume of the cleaning fluid onto the first target region of the garment via the first nozzle to:

bind odorous molecules in the first target region of the garment; and inject a scent into fabric of the garment;

wherein articulating the first nozzle comprises articulating the first nozzle, facing the interior surface of the garment, to:

apply steam across the interior surface of the garment; and increase a binding rate of cleaning fluid to odorous molecules in the first target region.

3. The method of claim 1:

further comprising:

triggering a camera, arranged in the kiosk, to capture an image of the garment;

detecting a set of features, representing a surface area of the garment, in the image;

correlating the set of features with a stain area on the garment; and calculating a dimension of the stain area based on the set of features; and wherein allocating the first volume of the cleaning fluid for application onto the first target region of the garment comprises:
calculating the first volume of the cleaning fluid proportional to the dimension of the stain area on the garment; and
assigning the first volume of the cleaning fluid to the stain area on the garment.

4. The method of claim 1, further comprising:
presenting a set of soil levels on a display integrated into the kiosk;
receiving selection of a first soil level, in the set of soil levels, of the first target region from the display;
predicting a second target region of the garment containing odorous molecules based on the garment type;
extrapolating a second volume of the cleaning fluid for application onto the second target region of the garment based on the first soil level and the fabric type; and
during the cleaning cycle, dispensing the second volume of the cleaning fluid onto the second target region of the garment via a second nozzle to:
modify odorous molecules in the second target region of the garment; and
perfume the garment.

5. The method of claim 4:
wherein receiving selection of the first soil level of the first target region comprises receiving selection of the first soil level of the first target region comprising an underarm region of the garment from the display;
wherein allocating the first volume of the cleaning fluid for application onto the first target region of the garment comprises calculating the first volume of the cleaning fluid based on the first soil level of the underarm region of the garment; and
wherein extrapolating the second volume of the cleaning fluid for application onto the second target region of the garment comprises:
receiving selection of a second soil level of a second target region comprising a back region of the garment from the display, the second soil level different from the first soil level; and
calculating the second volume of the cleaning fluid for application onto the back region of the garment less than the first volume of the cleaning fluid based on the second soil level.

6. The method of claim 1:
wherein receiving the garment within the chamber of the kiosk comprises receiving the garment on a hanger arranged within the chamber of the kiosk;
wherein accessing the set of garment characteristics of the garment comprises:
accessing a first signal from a load cell coupled to the hanger;
interpreting a first weight of the garment based on the first signal; and
receiving selection of the garment type, comprising a dress shirt type, from a user via a display integrated into the kiosk; and
wherein allocating the first volume of the cleaning fluid for application onto the first target region comprises:
identifying the first target region, comprising a first underarm region and predicted to contain odorous molecules, based on the dress shirt type; and
calculating the first volume of the cleaning fluid proportional to the first weight of the garment.

7. The method of claim 6, further comprising:
receiving a second garment on the hanger arranged within the chamber of the kiosk;
accessing a second signal from the load cell coupled to the hanger;
interpreting a second weight of the second garment based on the second signal;
receiving selection of a second garment type, comprising the dress shirt type, from the user via the display integrated into the kiosk; and
in response to the second weight exceeding the first weight and in response to the second garment type approximating the first garment type:
identifying a second target region of the second garment comprising a second underarm region, based on the dress shirt type;
calculating a second volume of cleaning fluid greater than the first volume of cleaning fluid; and
allocating the second volume of cleaning fluid for application onto the second underarm region of the second garment.

8. The method of claim 6, further comprising:
receiving a second garment on the hanger arranged within the chamber of the kiosk;
accessing a second signal from the load cell coupled to the hanger;
interpreting a second weight of the second garment based on the second signal;
receiving selection of a second garment type, comprising a sleeveless shirt type, from the user via the display integrated into the kiosk; and
in response to the second weight approximating the first weight and in response to discordance between the second garment type and the first garment type:
identifying a second target region of the second garment comprising a neck-line region, based on the sleeveless shirt type;
calculating a second volume of cleaning fluid less than the first volume of cleaning fluid; and
allocating the second volume of cleaning fluid for application onto the neckline region neck-line region of the second garment.

9. The method of claim 1:
further comprising triggering a camera, arranged in the kiosk, to capture an image of the garment; and
wherein accessing the set of garment characteristics of the garment comprises:
detecting a tag on the garment in a first region of the image;
extracting a first set of features from the first region of the image; and
based on the first set of features:
identifying the fabric type of the garment specified by the tag; and
identifying the garment type of the garment specified by the tag.

10. The method of claim 1:
wherein receiving the garment on the hanger arranged within the chamber of the kiosk comprises, in response to closure of a kiosk door:
locking the kiosk door;
triggering a camera, arranged in the kiosk, to capture an image of the garment;
detecting a first set of features, representing a surface area of the garment, in the image;
correlating the first set of features with a stain area on the garment; and calculating a dimension of the stain area based on the first set of features; and further comprising, during the cleaning cycle:

triggering the camera to capture a second image of the garment;

detecting a second set of features, representing the surface area of the garment, in the second image;

correlating the second set of features with the stain area on the garment;

calculating a second dimension of the stain area based on the second set of features, the second dimension less than the first dimension of the stain area; and in response to the second dimension of the stain area falling below a threshold dimension:

identifying reduction of the stain area of the garment;

terminating the cleaning cycle; and unlocking the kiosk door.

11. The method of claim 1:

wherein allocating the first volume of the cleaning fluid for application on the first target region of the garment comprises allocating the first volume of the cleaning fluid comprising:

a first proportion of Zinc ricinoleate configured to modify odorous molecules in the first target region of the garment;

a second proportion of a surfactant configured to increase wetting of the first proportion of Zinc ricinoleate into fabric of the garment;

a third proportion of a fragrance configured to inject a scent into fabric of the garment; and a fourth proportion of an alcohol configured to increase dispersion of the third proportion of the fragrance into fabric of the garment.

* * * * *